(12) United States Patent
Cavalier et al.

(10) Patent No.: US 11,421,094 B2
(45) Date of Patent: Aug. 23, 2022

(54) FUNCTIONALIZED PARTICULATE BICARBONATE AS BLOWING AGENT, FOAMABLE POLYMER COMPOSITION CONTAINING IT, AND ITS USE IN MANUFACTURING A THERMOPLASTIC FOAMED POLYMER

(71) Applicant: Solvay SA, Brussels (BE)

(72) Inventors: Karine Cavalier, Uccle (BE); Jorge Alejandro Kabbabe Malave, Bourg-la-Reine (FR); Jean-Philippe Pascal, Villers les Nancy (FR); Thibaud Louis Alfred Detoisien, Dombasle-sur-Meurthe (FR)

(73) Assignee: Solvay SA, Brussels (BE)

( * ) Notice: Subject to any disclaimer, the term of this patent is extended or adjusted under 35 U.S.C. 154(b) by 173 days.

(21) Appl. No.: 16/317,376

(22) PCT Filed: Jul. 20, 2017

(86) PCT No.: PCT/EP2017/068399
§ 371 (c)(1),
(2) Date: Jan. 11, 2019

(87) PCT Pub. No.: WO2018/015506
PCT Pub. Date: Jan. 25, 2018

(65) Prior Publication Data
US 2019/0225765 A1    Jul. 25, 2019

Related U.S. Application Data

(60) Provisional application No. 62/364,843, filed on Jul. 20, 2016.

(51) Int. Cl.
*C08J 9/08* (2006.01)
*C08J 3/22* (2006.01)
*C08J 9/00* (2006.01)
*C08L 27/06* (2006.01)

(52) U.S. Cl.
CPC ............. *C08J 9/08* (2013.01); *C08J 3/226* (2013.01); *C08J 9/0023* (2013.01); *C08J 9/0028* (2013.01); *C08J 9/0061* (2013.01); *C08L 27/06* (2013.01); *C08J 2203/02* (2013.01); *C08J 2327/06* (2013.01); *C08J 2403/02* (2013.01); *C08J 2405/00* (2013.01); *C08J 2405/02* (2013.01); *C08J 2427/06* (2013.01); *C08J 2429/04* (2013.01); *C08J 2433/10* (2013.01); *C08J 2471/02* (2013.01); *C08J 2491/06* (2013.01); *C08J 2493/04* (2013.01); *C08L 2203/14* (2013.01); *C08L 2205/025* (2013.01); *C08L 2310/00* (2013.01)

(58) Field of Classification Search
CPC ... C08J 9/08; C08J 3/226; C08J 9/0023; C08J 9/0028; C08J 9/0061; C08J 2403/02; C08J 2405/00; C08J 2405/02; C08J 2427/06; C08J 2429/04; C08J 2433/10; C08J 2471/02; C08J 2491/06; C08J 2493/04; C08J 9/30; C08L 27/06; C08L 2203/14; C08L 2205/025; C08L 2310/00; C08L 2203/02; C08L 2327/06; C08K 9/08

See application file for complete search history.

(56) References Cited

U.S. PATENT DOCUMENTS

| | | | |
|---|---|---|---|
| 2,602,784 | A | 7/1952 | Taylor |
| 4,892,854 | A | 1/1990 | Pastorino et al. |
| 5,009,810 | A | 4/1991 | Wason et al. |
| 5,047,440 | A | 9/1991 | Wilson, Jr. |
| 5,234,963 | A | 8/1993 | Garcia et al. |

(Continued)

FOREIGN PATENT DOCUMENTS

| | | |
|---|---|---|
| CN | 1309765 C | 4/2007 |
| CN | 102190811 A | 9/2011 |

(Continued)

OTHER PUBLICATIONS

Information sheet BICAR® Foam from Solvay, accessed online via solvay.com on Jul. 18, 2016.

(Continued)

*Primary Examiner* — Kara B Boyle
(74) *Attorney, Agent, or Firm* — Osha Bergman Watanabe & Burton LLP

(57) ABSTRACT

A chemical blowing agent for foaming a thermoplastic polymer, for example PVC plastisol or a polymer resin in an extrusion process, comprising a functionalized particulate bicarbonate containing at least one additive, preferably excluding an exothermic blowing agent. The additive may be selected from the group consisting of polymers; inorganic salts; oils; fats; resin acids, any derivative thereof, and salts thereof; amino acids; fatty acids; carboxylic or polycarboxylic acids, soaps; waxes; derivatives thereof; salts thereof; or any combinations thereof. The particulate bicarbonate may be functionalized by spray-drying, coating, extrusion or co-grinding with at least one additive. The functionalized particulate bicarbonate may comprise 50 wt % to less than 100 wt % of the bicarbonate component, and 0.02-50 wt % of the additive. A foamable polymer composition comprising such chemical blowing agent. A process for manufacturing a foamed polymer, such as foamed PVC, comprising shaping and heating the foamable polymer composition, and a foamed polymer obtained by such process.

25 Claims, No Drawings

(56) References Cited

U.S. PATENT DOCUMENTS

| | | | |
|---|---|---|---|
| 5,411,750 | A | 5/1995 | Lajoie et al. |
| 5,611,962 | A * | 3/1997 | Garcia .................... B29B 9/065 264/122 |
| 5,688,449 | A | 11/1997 | Fox |
| 2003/0060523 | A1 | 3/2003 | Czaplicki |
| 2008/0090017 | A1 | 4/2008 | Jo et al. |
| 2008/0090919 | A1 | 4/2008 | Jo et al. |
| 2008/0281006 | A1 | 11/2008 | O'Leary et al. |
| 2011/0224317 | A1 * | 9/2011 | O'Leary .................... C08J 9/08 521/70 |
| 2014/0148572 | A1 | 5/2014 | Zhao et al. |
| 2015/0267024 | A1 * | 9/2015 | Stevens .................. C08J 9/0033 521/73 |

FOREIGN PATENT DOCUMENTS

| | | | |
|---|---|---|---|
| CN | 102964619 | A | 3/2013 |
| CN | 103881238 | A | 6/2014 |
| CN | 104129186 | A | 11/2014 |
| CN | 105504499 | A | 4/2016 |
| CN | 106115744 | A | 11/2016 |
| DE | 102010061869 | A1 | 5/2012 |
| EP | 2508555 | A1 | 10/2012 |
| EP | 2921475 | A1 | 9/2015 |
| EP | 3037387 | A1 | 6/2016 |
| EP | 3037388 | A1 | 6/2016 |
| GB | 2314841 | A | 1/1998 |
| JP | 1062334 | A2 | 3/1989 |
| JP | 2001270956 | A * | 10/2001 |
| JP | 2002069372 | A2 | 3/2002 |
| WO | WO 90/14384 | A1 | 11/1990 |
| WO | WO 2009/038783 | A1 | 3/2009 |
| WO | WO 2014/096457 | A1 | 6/2014 |
| WO | WO 2015/140282 | A1 | 9/2015 |
| WO | WO 2016/102591 | A1 | 6/2016 |
| WO | WO 2016/102603 | A1 | 6/2016 |

OTHER PUBLICATIONS

Data sheet for "BYK-3155 Silicone-free polymer-based air release additive for PVC plastisols. Standard additive, all-purpose"., Issued on Sep. 2013 from BYK Additives and Instuments, accessed online on Mar. 6, 2017 via https://www.byk.com/en/additives/additives-by-name/byk-3155.php.
Commission Directive 2004/1/EC of Jan. 6, 2004 amending Directive 2002/72/EC as regards the suspension of the use of azodicarbonamide as blowing agent, Official Journal of the European Union, accessed online on Dec. 20, 2018 via https://eur-lex.europa.eu/LexUriServ/LexUriServ.do?uri=OJ:L:2004:007:0045:0046:EN:PDF.
Si Jia Yao et al, "Modifying Sodium Bicarbonate for Foaming Polymers"—Advanced Materials Research (Durnten-Zurich, Switzerland) (2014), vol. 940(Machinery, Materials Science and Engineering Applications),pp. 59-62.
Cao, Xianwu et al.—"Thermal analysis of modified sodium bicarbonate" (lang.: Chinese—Huagong Jinzhan (2012), vol. 31 (10),pp. 2176-2182—only English abstract provided.
U.S. Appl. No. 15/538,765, David Jean Lucien Savary, filed Jun. 22, 2017, WO 2016/102603.
U.S. Appl. No. 15/538,769, David Jean Lucien Savary, filed Jun. 22, 2017, WO 2016/102591.

* cited by examiner

FUNCTIONALIZED PARTICULATE BICARBONATE AS BLOWING AGENT, FOAMABLE POLYMER COMPOSITION CONTAINING IT, AND ITS USE IN MANUFACTURING A THERMOPLASTIC FOAMED POLYMER

CROSS-REFERENCE TO RELATED APPLICATIONS

The present application is a U.S. national stage entry under 35 U.S.C. § 371 of International Application No. PCT/EP2017/068399 filed Jul. 20, 2017, which claims priority benefit to U.S. provisional application No. 62/364,843, filed on Jul. 20, 2016, its whole content being incorporated herein by reference for all purposes.

STATEMENT REGARDING FEDERALLY SPONSORED RESEARCH OR DEVELOPMENT

Not applicable.

TECHNICAL FIELD OF THE INVENTION

The invention relates to a functionalized particulate bicarbonate containing an additive. The invention also relates to a foamable composition containing it, such as a PVC plastisol, and to its use/method for manufacturing a thermoplastic foamed polymer, in particular foamed PVC.

BACKGROUND

Polymer foams are found virtually everywhere in our modern world and are used in a wide variety of applications such as disposable packaging of fast-food, the cushioning of furniture and insulation material.

Polymer foams are made up of a solid and gas phase mixed together to form a foam. By combining the two phases fast results in foaming and forming a polymer matrix with either gas bubbles or gas tunnels incorporated in it, which is known as either closed-cell or open-cell structure. Closed-cell foams are generally more rigid, while open-cell foams are usually flexible.

The gas that is used in the foam is termed a blowing agent, and can be either chemical or physical. Chemical blowing agents are chemicals that take part in a reaction or decompose, giving off a gas in the process. Physical blowing agents are gases that do not react chemically in the foaming process and are therefore inert to the polymer forming the matrix.

For the processing of thermoplastic materials, such as polyvinyl chloride (PVC) or polyolefins (PO, PE, PP), styrenics (PS, ABS, ASA, SAN) and natural and synthetic rubber such as nitrile butadiene rubber (NBR) or chloroprene rubber (CR), chemical blowing agents are used for decades. Chemical blowing agents are additives in the manufacturing of foamed thermoplastic polymers. Chemical blowing agents are stable at room temperature but decompose at elevated temperatures during the processing of the polymers while generating gas. This gas creates a foam structure in the thermoplastic polymer. Chemical blowing agents are used in a wide variety of applications including the production of foamed wall papers, artificial leather, floor and wall coverings, carpet backings, thermal insulation materials, insulation sealants, footwear, automotive components, cable insulation, and packaging materials.

Established blowing agents are exothermic blowing agents such as azodicarbonic acid diamide (azodicarbonamide, ADC, ADCA, CAS No. 123-77-3), the sulfonhydrazides 4,4'-oxybis(benzenesulfonylhydrazide) (OBSH, CAS No. 80-51-3) and p-toluenesulfonylhydrazide, (TSH, CAS No. 1576-35-8) and endothermic blowing agents such as carbonates, like sodium bicarbonate (SBC, $NaHCO_3$, CAS No. 144-55-8), and citric acid and its esters.

Since many years, azodicarbonamide (ADC) is one of the most effective and widely used chemical blowing agents for use in cellular thermoplastic and rubber applications (cf. for example DE-AS 1 037 700). Azodicarbonamide decomposes on heating to give a high volume of gas, which consists mainly of nitrogen and carbon monoxide. These decomposition products are suitable to create a fine and uniform cell structured foam with a little shrink, a property which is fundamental in the production of soft foams such as plasticized PVC (P-PVC) or rubber foams. The decomposition temperature of azodicarbonamide can be reduced from 200-220 degrees centigrade to as low as 125 degrees centigrade by the addition of suitable activators (kickers), but useful decomposition rates are usually only achieved at 140 degrees centigrade and above. Activators or kickers are additives known in the art which are used to influence the decomposition temperature and rate of gas release of the blowing agent.

Azodicarbonamide may be combined with other chemical blowing agents in order to improve the processing behavior of the thermoplastic material and to optimize the end product. For example, in cellular rigid PVC (U-PVC; without softening of the polymer by adding plasticizers) applications such as foamed profile or sheet, ADC may be used in combination with sodium bicarbonate to produce a foam structure with acceptable technical performance (GB2314841). Because of differences in melt rheology, processing and demands on the foam structure, this technique cannot be transferred to plasticized, soft PVC and PVC plastisol processing.

However, azodicarbonamide as a blowing agent in plastics has been banned in the European Union since August 2005 for the manufacture of plastic articles that are intended to come into direct contact with food (COMMISSION DIRECTIVE 2004/1/EC of 6 Jan. 2004 amending Directive 2002/72/EC as regards the suspension of the use of azodicarbonamide as blowing agent". Official Journal of the European Union. 2004 Jan. 13).

Furthermore, in December 2012, the European Chemicals Agency (ECHA) announced that azodicarbonamide was to be included in their Candidates List of Substances of Very High Concern (SVHC) under Articles 57 and 59 of the Reach Regulation, which will limit or restrict the future use of ADC. Therefore, there is a need for substitutes for ADC having the same beneficial performance, especially for applications in foamed PVC.

Possible alternative solutions are provided by the classes of sulfonylhydrazides and carbonates, but these substances exhibit some disadvantages when used as blowing agents, especially when used for applications in plasticized, soft PVC.

p-Toluenesulfonylhydrazide (TSH) starts decomposition at a temperature of about 105 degrees centigrade, which is considered as being too low for the processing of rigid and plasticised PVC. 4,4'-Oxybis(benzenesulfonylhydrazide) (OBSH) also releases nitrogen upon decomposition but the gas generation characteristic is different to that of azodicarbonamide. At temperatures above the decomposition point of OBSH the nitrogen release is rapid, but occurs at a different temperature compared to azodicarbonamide. Below the absolute product decomposition temperature of about 155 degrees centigrade, the decomposition and thus the gas release is slow. Additionally OBSH has the disadvantage that the decomposition products and the foamed end article produced have an unintended brownish discoloration at the typical P-PVC processing temperatures which are higher than 180 degrees centigrade The carbonates such as sodium bicarbonate do not liberate nitrogen but carbon dioxide and possibly water upon decomposition. Typically for carbon dioxide is its high solubility in the polymer, but it permeates out of the polymer matrix more rapidly than nitrogen, making it less efficient as a foaming agent, especially in plasticized PVC applications. The carbonates are generally not useful for the production of soft foams with a fine and uniform cell structure with little shrink. Sodium bicarbonate, the most common representative of the carbonates used as chemical blowing agents, has a slow decomposition and release of gas, which occurs over a wider temperature range in comparison to both ADC and OBSH. The decomposition temperature of sodium bicarbonate can be influenced by citric acid.

Alkali metal bicarbonate particles, such as sodium bicarbonate particles and potassium bicarbonate particles, are known in the art. These products have many properties which make them interesting and extensively used in several technical fields, such as pharmaceutical industry, the feed and food industry, in detergents and in the treatment of non-ferrous metals.

The most common way to manufacture bicarbonate particles is crystallization by carbonization with carbon dioxide of a solution of the corresponding alkali metal (sodium or potassium carbonate for example) or a solution of the hydroxide of the corresponding alkali metal. It is also common to crystallize bicarbonates by controlled cooling of bicarbonate solutions, or by evaporating the solvent of such solutions.

For the industrial use of alkali metal bicarbonate particles control of specific properties of the particles, e.g., their bulk density (poured bulk density) or angle of repose is required. Some methods to control these parameters, such as a bulk density are known in the art. For example, U.S. Pat. No. 5,411,750 discloses a method of producing sodium bicarbonate powder with a bulk density between 70 and 500 $kg/m^3$. The particles are prepared by spray-drying a dilute aqueous solution of the bicarbonate with an alkali metal salt as additive. WO 2014/096457 discloses a method for producing sodium bicarbonate particles by spray-drying of an aqueous solution comprising 1-10% by weight of sodium bicarbonate and an additive selected from the group consisting of magnesium salt, sodium alkyl benzene sulfonate and soybean lecithin.

The above mentioned non-azodicarbonamide blowing agents fail to meet the expected requirement profile of a good blowing agent, and are in need of improvement in this respect.

SUMMARY

An aspect of the present invention provides a functionalized particulate bicarbonate, which can be used advantageously as a non-azodicarbonamide blowing agent in polymer manufacture, particularly for the preparation of a foamed thermoplastic material, such as foamed PVC, polyurethanes, polyamides, polyolefins.

One aspect of the present invention relates to a functionalized particulate bicarbonate and its use as chemical blowing agent for foaming a thermoplastic polymer, or
a polymer resin in an extrusion process.

The additive in the functionalized particulate bicarbonate may comprise or consist of, as non-limiting examples, at least one following compound:
  one or more polymers;
  one or more amino acids, any derivative thereof, and salts thereof;
  one or more inorganic salts;
  one or more oils;
  one or more fats;
  one or more resin acids, any derivative thereof, and salts thereof;
  one or more fatty acids, any derivative thereof, and salts thereof;
  a carboxylic or polycarboxylic acid, derivative thereof (such as esters), or salts thereof
  one or more soaps;
  one or more waxes; or
  any combinations thereof.

The functionalized particulate bicarbonate may be spray-dried bicarbonate particles in the presence of said additive, or co-milled bicarbonate particles in the presence of said additive, or coated with the additive in a fluid bed, or granulated with the additive in a fluid bed, or coated with the additive in an extruding device.

The additive in the functionalized particulate bicarbonate is more preferably leucine when the functionalized particulate bicarbonate is spray-dried.

The functionalized particulate bicarbonate may comprises at least 50% by weight and less than 100% by weight of the bicarbonate component, and from 50% to 0.02% by weight of at least one of said additive. The functionalized particulate bicarbonate may comprise at least 65% by weight and less than 100% by weight of the bicarbonate component, and from 35% to 0.02% by weight of at least one of said additive. The functionalized particulate bicarbonate may comprise at least 75% by weight and less than 100% by weight of the bicarbonate component, and from 25% to 0.02% by weight of at least one of said additive. The functionalized particulate bicarbonate may comprise at least 90% by weight and less than 100% by weight of the bicarbonate component, and from 10% to 0.02% by weight of at least one of said additive.

Another aspect of the present invention relates to a chemical blowing agent for foaming a thermoplastic polymer, for example PVC plastisol or a polymer resin in an extrusion process, said chemical blowing agent comprising the functionalized particulate bicarbonate, wherein said functionalized particulate bicarbonate contains at least one additive.

In a preferred embodiment, the chemical blowing agent is endothermic.

In a preferred embodiment, the chemical blowing agent does not contain a blowing agent which is exothermic.

In a preferred embodiment, the chemical blowing agent does not contain a blowing agent which would liberate nitrogen gas and/or ammonia during heating when a foamed polymer is made using such chemical blowing agent.

In most preferred embodiments, the chemical blowing agent comprises or consists of the functionalized particulate sodium bicarbonate.

In some embodiments, the chemical blowing agent further comprises a second compound which liberates $CO_2$ upon heating, said second compound being selected from the group consisting of a carboxylic or polycarboxylic acid, derivative thereof (such as esters), or salts thereof. The second compound may comprise or may be at least one of:

fumaric acid,
tartaric acid,
citric acid, citrates (such as sodium hydrogen citrate, disodium citrate), or esters of citric acid; or
combination thereof.

The second compound may be functionalized with at least one additive which is different or the same as the one used in the functionalized particulate bicarbonate.

Another aspect of the present invention relates to a foamable polymer composition comprising the functionalized particulate bicarbonate as blowing agent, wherein said functionalized particulate bicarbonate contains the at least one additive.

In some embodiments, the foamable polymer composition comprises the functionalized particulate bicarbonate as a first endothermic blowing agent and a carboxylic or polycarboxylic acid, ester thereof, or salt thereof, as a second endothermic blowing agent. The carboxylic or polycarboxylic acid, ester thereof, or salt thereof may be also functionalized. The functionalized particulate bicarbonate and the functionalized carboxylic or polycarboxylic acid, ester thereof, or salt thereof may be functionalized together or separately.

In particular embodiments, the foamable polymer composition does not contain a blowing agent which would liberate nitrogen gas and/or ammonia during heating when a foamed polymer is made from such foamable composition.

In some embodiments, the foamable polymer composition does not contain an exothermic blowing agent.

During foaming of polymer resin (plastisol or extrusion process) when particles of non-functionalized sodium bicarbonate are used as foaming agent, it was observed that the gas release occurs earlier than expected, due to the quick decomposition of bicarbonate. It has been found that functionalizing the bicarbonate particles by coating, by granulation, and/or by encapsulating with specific additives enhances the protection of the bicarbonate particles with an inactive barrier, which delays the thermal decomposition when having various bicarbonate particle sizes, small (some may be nano-sized) and large (some may be micron-sized).

The functionalized particulate bicarbonate according to this aspect of the present invention is preferably a particulate sodium bicarbonate which is functionalized with at least one additive. This functionalized particulate sodium bicarbonate shows improved properties of expansion in comparison with nonfunctionalized particulate sodium bicarbonate of equivalent size. A "nonfunctionalized particulate sodium bicarbonate" is defined as a particulate sodium bicarbonate made without the additive(s) used in the making of the functionalized particulate sodium bicarbonate. The functionalized particulate sodium bicarbonate in the foamable polymer composition may reduce the time of gelation at a temperature above glass transition temperature Tg and/or above melting temperature Tm of the polymer. For example for PVC plastisol, the gelation time at temperature above glass transition temperature Tg and/or above melting temperature Tm of the polymer may be less than 90 seconds, preferably 80 seconds or less, or 70 seconds or less, or more preferably 60 seconds or less.

A process for manufacturing a polymer may comprise heating the foamable polymer composition which comprises the functionalized particulate bicarbonate at a temperature suitable for liberating CO2 gas and melting the polymer during a gelation time at a temperature above glass transition temperature Tg and/or above melting temperature Tm of the polymer which is less than 130 seconds.

For some embodiments of a process for manufacturing a PVC polymer, when the foamable polymer composition is heated, the temperature suitable for liberating CO2 gas from the functionalized particulate sodium bicarbonate and melting a PVC polymer may be from 190 to 210° C., preferably from 200 to 210° C., during a gelation time from 90 seconds to 120 seconds to provide a foamed PVC polymer.

When the foamable polymer composition is spread coated on a surface before heating and polymer melting, the foamed polymer may have an expansion ratio of at least 270, preferably at least 280, more preferably at least 300 and/or has a density of less than 0.6 g/cm$^3$, preferably less than 0.55 g/cm$^3$, more preferably at most 0.5 g/cm$^3$. The expansion ratio is calculated based on the ratio of a final thickness over an initial thickness of a spread coated layer of the foamable polymer composition as that layer gets heated during gelation in an oven.

The functionalized sodium bicarbonate particles are produced in the presence of at least one additive from a solution containing sodium bicarbonate or directly from solid sodium bicarbonate particles. The additive in the functionalized particulate bicarbonate may comprise or consist of, as non-limiting examples, at least one following compound:
 one or more polymers;
 one or more amino acids, any derivative thereof, and salts thereof;
 one or more inorganic salts;
 one or more oils;
 one or more fats;
 one or more resin acids, any derivative thereof, and salts thereof;
 one or more fatty acids, any derivative thereof, and salts thereof;
 a carboxylic or polycarboxylic acid, derivative thereof (such as esters), or salts thereof
 one or more soaps;
 one or more waxes; or
 any combinations of two or more thereof.

In some embodiments, the additive may comprise or consist of a polymer selected from the group consisting of polyvinylalcohol, polyglycol, polysaccharide, poly(meth)acrylic acid, poly(acrylic acid co-maleic acid, polyethylenenimine, polyvinylpyrrolidone, N-2(-Hydroxypropyl) methacrylamide, polyoxyalkylenes and derivatives thereof including polyethylene glycols, and combinations thereof.

In some embodiments, the additive may comprise or consist of a polysaccharide selected from the group consisting of hydrolyzed starch, carboxymethylcellulose, alginic acid and its salt, arabic gum, carrageenan; guar gum, locust bean gum, xantham gum and combinations thereof.

In some embodiments, the additive may comprise or consist of an amino acid, derivative thereof, or salt thereof selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine and combinations thereof.

In some embodiments, the additive may comprise or consist of an inorganic salt selected from the group consisting of silicates (e.g., sodium silicate), NaCl, KCl, MgCl2, sodium phosphate, borates, nitrates, nitrites, sulfates, sulfites and combinations thereof.

In some preferred embodiments, the additive may comprise or consist of:
 an amino acid, derivative thereof, or salt thereof,
 a polysaccharide (such as hydrolyzed starch, carboxymethylcellulose), a carboxylic or polycarboxylic acid, derivative thereof (such as esters), or salts thereof
a resin acid, derivative thereof, or salt thereof,
a fatty-acid, derivative thereof, or salt thereof, or
any combination thereof.

In some preferred embodiments, the additive may comprise or consist of:
a polymer (such as polyoxyalkylenes and derivatives thereof including polyethylene glycols, poly(meth)acrylates and derivatives thereof, polyvinylalcohol and polysaccharides, including modified, in particular hydrolyzed starch, maltodextrin and arabic gum),
an amino acid, derivative thereof or salt thereof (such as leucine),
an oil (such as epoxidized soy bean oil),
a resin acid, derivatives thereof, or salt thereof (such as rosin acid),
a fatty acid, derivatives thereof, or salt thereof (such as stearic acid, lauric acid, linoleic acid and glycerol mono stearate),
a wax (such as bees wax and carnauba wax), or,
any combination of two or more thereof.

In some preferred embodiments, the additive may comprise or consist of:
an amino acid, derivative thereof, or salt thereof,
a polysaccharide (such as hydrolyzed starch, carboxymethylcellulose),
a carboxylic or polycarboxylic acid, derivative thereof (such as esters), or salts thereof
a resin acid, derivative thereof, or salt thereof,
a fatty-acid, derivative thereof, or salt thereof, or
any combination thereof.

In more preferred embodiments, the additive may comprise or consist of:
a polyoxyalkylene or a derivative thereof including a polyethylene glycol, a poly(meth)acrylate or a derivative thereof,
polyvinylalcohol
starch, maltodextrin or arabic gum,
leucine,
an epoxidized soy bean oil,
rosin acid or a derivative thereof,
stearic acid, lauric acid, linoleic acid, or glycerol mono stearate,
beeswax or carnauba wax, or,
any combination of two or more thereof.

It should be understood that one or more elements from these lists may be omitted.

The functionalized particulate bicarbonate can be obtained by at least one of the following processes:
by spray-drying (also known as atomization), wherein the additive is dissolved in the bicarbonate-containing solution.
by grinding or co-grinding (also known as milling or co-milling) with the additive(s) in emulsion or powder form;
by spray coating and granulation within a fluidized bed,
by spray agglomeration within a fluidized bed,
by spray chilling (e.g., spray cooling, spray freezing),
by roller compaction,
and/or
by extrusion, including simultaneous mixing/extrusion.

It should be understood that one or more methods from this list may be omitted.

In preferred embodiments, the functionalized particulate bicarbonate can be obtained by at least one of the following processes:
by grinding or co-grinding (also known as milling or co-milling) with the additive(s) in emulsion or powder form;
by spray coating and granulation within a fluidized bed, and/or
by extrusion, including simultaneous mixing/extrusion.

The functionalized particulate bicarbonate which is obtained by at least one said process may be further subjected to milling to reduce its mean particle size.

The functionalized particulate bicarbonate shows excellent $CO_2$ release properties. As determined by TGA analysis, the maximum loss temperature of the functionalized particulate bicarbonate is preferably higher than the non-functionalized bicarbonate without additive. The $CO_2$ release of the functionalized particulate bicarbonate typically has its maximum at a temperature of at least 130° C., preferably at a temperature of at least 135° C., more preferably at a temperature of at least 140° C., even more preferably at a temperature of at least 145° C., and particularly preferably at a temperature of at least 155° C.

As determined by DSC thermal analysis, the maximum peak temperature of the functionalized particulate bicarbonate is preferably higher than the non-functionalized bicarbonate without additive. The DSC maximum peak temperature of the functionalized particulate bicarbonate may be at least 140° C., preferably at least 145° C., more preferably at least 150° C., even more preferably at a temperature of at least 155° C., and particularly preferably at least 160° C.

DETAILED DESCRIPTION

Definitions

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

The term "thermoplastic material" shall mean a polymer that becomes pliable or moldable above a specific temperature, so is capable of flow at high temperatures below the thermal decomposition temperature and returns to a solid state upon cooling. A polymer is a macromolecular compound prepared by reacting (i.e. polymerizing, condensation) monomers of the same or different type, including homo- and copolymers. Thermoplastic materials are made by chain polymerization, polyaddition and/or polycondensation.

The term "functionalized particulate bicarbonate" is to be understood as defining particles which comprise a bicarbonate and an additive, preferably within the same particle. For example, the additive may form a layer or coating on the bicarbonate or the bicarbonate may form a layer or coating on the additive. Alternatively or additionally the additive may be embedded within a matrix of the bicarbonate or vice versa. The particle comprising bicarbonate and additive may be an agglomeration of smaller particles or small particles of one of the components may be agglomerated to a larger particle (or larger particles) of the other component. Preferably, the term "functionalized particulate bicarbonate" does not include a mere mixture of bicarbonate particles and at least one additive whether it be in liquid form or in the form of particles.

The term "functionalizing additive", as used herein, refers to a compound that is capable of improving at least one $CO_2$ release property of sodium bicarbonate when the additive is formulated with the sodium bicarbonate, relative to the sodium bicarbonate alone (without additive). For example, the functionalizing additive is capable of increasing the $CO_2$ release beginning temperature and/or the $CO_2$ release maximum temperature of the functionalized particulate bicarbonate, determined in accordance with Example 54 of the present application.

The term "comprising" includes "consisting essentially of" and "consisting of".

The term "foamed" in connection with the terms "thermoplastic material", "polymer" and "PVC" shall mean such material, polymer, or PVC with a cellular structure which is formed by gas generation from thermal decomposition and/or chemical reaction of a chemical blowing agent during processing.

The term "ppm" means parts per million, expressed by weight (e.g., 1 ppm=1 mg/kg).

The term "pcr" means parts by weight of resin (e.g., 80 per of additive=80 g additive per 100 g of resin).

The sign "%" or "wt %" refers to "weight percent" unless specifically stated otherwise.

The term "powder" shall mean a compound consisting of milled (ground), extruded, or spray-dried solid particles.

The term "exothermic blowing agent" defines a chemical that generates heat during its decomposition. An exothermic blowing agent typically undergoes rapid decomposition in a narrow temperature range. Generally speaking, the exothermic chemical blowing agents are associated as those chemicals giving $N_2$ as the main blowing gas (>50 vol % of the generated gas is $N_2$). Other minor gases though may evolve from the decomposition of the exothermic chemical blowing agent. These other minor gases may include carbon monoxide, also in small amounts (<5 vol %) of ammonia, and/or $CO_2$.

The term "endothermic blowing agent" defines a chemical that absorbs heat during its decomposition. An endothermic blowing agent typically has broader decomposition ranges in terms of both temperature and time. Most endothermic chemical blowing agents generate $CO_2$ as the main blowing gas (>50 vol % of the generated gas is CO2).

The $CO_2$ release properties of the functionalized particulate bicarbonate according to one aspect of the present invention can be determined by performing a thermogravimetric analysis (TGA) of a functionalized particulate bicarbonate sample, measuring the weight loss of the sample in dependence of the temperature. The $CO_2$ release properties are characterized by the derivate value for weight loss depending on the temperature. The $CO_2$ release beginning temperature is the temperature where the derivate value for weight loss starts to raise. The $CO_2$ release maximum temperature is the temperature where the derivate value for weight loss is at maximum. Typically, heating is performed between 30° C. and 250° C. at a speed of 10° C./min. Thermogravimetric analysis can be performed for example on an STD Q600 V20.9 Build 20 thermogravimetric analysis instrument (provided by TA Instruments).

A plurality of elements includes two or more elements.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

The phrase 'A1, A2, . . . and/or An' with n≥3 includes the following choices: any single element Ai (i=1, 2, . . . n); or any sub-combinations of from two to (n−1) elements chosen from A1, A2, . . . , An; or combination of all elements Ai (i=1, 2, . . . n). For example, the phrase 'A1, A2, and/or A3' refers to the following choices: A1; A2; A3; A1+A2; A1+A3; A2+A3; or A1+A2+A3.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for illustration purpose, when it is stated that "the element X is generally at least 10, advantageously at least 15", the present description also includes another embodiment where a new minimum can be selected between 10 and 15, for example: where "the element X is at least 11", or also where: "the element X is at least 13.74", etc.; 11 or 13.74 being values included between 10 and 15. Also for illustration purpose, when it is indicated that "the element X is generally at most 15, advantageously at most 10", the present description also includes another embodiment where a new maximum can be selected between 10 and 15.

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

For example, when in an embodiment the choice of an element from a group of elements is described, the following embodiments are also explicitly described:

the choice of two or more elements from the group, the choice of an element from a subgroup of elements consisting of the group of elements from which one or more elements have been removed.

The use of the singular 'a' or 'one' herein includes the plural unless specifically stated otherwise.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

Functionalized Particulate Bicarbonate

One aspect of the present invention relates to a functionalized particulate bicarbonate.

The functionalized particulate bicarbonate comprises a bicarbonate ingredient which preferably is an alkali or ammonium salt, such as sodium bicarbonate, potassium bicarbonate, and ammonium bicarbonate. Sodium and potassium bicarbonate, in particular sodium bicarbonate being preferred.

In some embodiments, the functionalized particulate bicarbonate preferably comprises at least 50% by weight, or at least 55% by weight, or at least 60% by weight, or even at least 65% by weight, but less than 100% by weight of the bicarbonate ingredient (e.g., ammonium, sodium or potassium bicarbonate).

In some embodiments, the functionalized particulate bicarbonate may comprise at least 90% by weight, or at least 93% by weight, or at least 94% by weight, or even at least 95% by weight, but less than 100% by weight of the bicarbonate ingredient (e.g., ammonium, sodium or potassium bicarbonate).

In some particular embodiments, the functionalized particulate bicarbonate preferably comprises at least 90% by weight but less than 100% by weight of an alkali metal bicarbonate. The functionalized particulate bicarbonate preferably comprises at least 92% by weight of an alkali metal bicarbonate, at least 93% by weight, more preferably at least 94% by weight, in particular at least 95% by weight of the alkali metal bicarbonate, in particular sodium bicarbonate.

In some embodiments, the functionalized particulate bicarbonate may have 50% by weight or less, or 45% by weight or less, or 40% by weight or less, or even 35% by weight or less, of at least one additive.

In some particular embodiments, the functionalized particulate bicarbonate contains 10% by weight or less, or 7% by weight or less, or 5% by weight or less, or 3% by weight or less, of the additive.

The additive should be present in the functionalized particulate bicarbonate according to the present invention in the amount of at least 0.02% by weight, preferably at least 0.05% by weight, in particular at least 0.1% by weight. The higher the weight % of the additive in the functionalized particulate bicarbonate, the more disadvantageous it will be for cost reasons. Preferably, to reduce cost of the more expensive additive compared to the bicarbonate ingredient, it is desirable to use at most 8% by weight, more preferably at most 6% by weight, in particular at most 5% by weight of the additive in the functionalized particulate bicarbonate.

However in embodiments where the additive is relatively not expensive (for example when its cost is not more than twice that of the bicarbonate ingredient), it may be desirable to use at least 5% by weight, more preferably at least 7% by weight, in particular at least 10% by weight of the additive and/or at most 50% by weight, more preferably at most 40% by weight, yet more preferably at most 35% by weight in the functionalized particulate bicarbonate.

In some particular embodiments, the functionalized particulate bicarbonate may comprise 0.02-50%, or 0.02-45%, or 0.02-40%, or 0.02-35%, by weight of at least one additive.

In some particular embodiments, the functionalized particulate bicarbonate may comprise more than 10% and up to 50% by weight of at least one additive.

In some embodiments, for cost effectiveness, the functionalized particulate bicarbonate may comprise from 0.02% to 10% by weight of the additive.

In particular embodiments, the functionalized particulate bicarbonate may comprise at least 65% by weight and less than 100% by weight of the bicarbonate component, and from 35% to 0.02% by weight of at least one additive; or may comprise at least 75% by weight and less than 100% by weight of the bicarbonate component, and from 25% to 0.02% by weight of at least one additive.

The functionalized particulate bicarbonate is preferably used as a blowing agent for foamed or extruded polymers (such as foamed PVC or polyurethanes; extruded PVC, polyolefins, polyamides), preferably used as an endothermic blowing agent. Non-limiting examples of polymers are polyvinyl chloride (PVC), polyurethanes, polyolefins (PO, PE, PP), styrenics (PS, ABS, ASA, SAN) and natural and synthetic rubber such as nitrile butadiene rubber (NBR) or chloroprene rubber (CR), polyamides, polyimides.

The functionalized particulate bicarbonate may further contain an additive which is capable of liberating $CO_2$ and which is also used for functionalizing the particulate bicarbonate. This additive may be considered as a secondary blowing agent in the functionalized particulate bicarbonate. Not only this additive would provide an increase in the $CO_2$ generation when the functionalized particulate bicarbonate is used as an endothermic blowing agent, but also this additive would protect the bicarbonate core from premature $CO_2$ release by protecting its surface (or part thereof). This $CO_2$-liberating additive may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred $CO_2$-liberating additive may include at least one of:
fumaric acid,
tartaric acid, or
citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred $CO_2$-liberating additive comprises or consists of citric acid, esters thereof, or salts thereof.

In some embodiments, the functionalized particulate bicarbonate does not contain citric acid, esters thereof, or salts thereof.

In some embodiments, the functionalized particulate bicarbonate does not contain an exothermic blowing agent.

In some particular embodiments, the functionalized particulate bicarbonate does not contain a compound used as blowing agent which liberates ammonia.

In some particular embodiments, the functionalized particulate bicarbonate does not contain a compound used as blowing agent which liberates nitrogen gas. Examples of blowing agents which liberate nitrogen gas are exothermic blowing agents such as azodicarbonic acid diamide (azodicarbonamide, ADC, ADCA, CAS No. 123-77-3), the sulfonhydrazides 4,4'-oxybis(benzenesulfonylhydrazide) (OBSH, CAS No. 80-51-3) and p-toluenesulfonylhydrazide, (TSH, CAS No. 1576-35-8).

In preferred embodiments, the functionalized particulate bicarbonate does not contain azodicarbonamide.

In alternate or additional preferred embodiments, the functionalized particulate bicarbonate does not contain benzenesulfonylhydrazide.

In alternate or additional embodiments, the functionalized particulate bicarbonate does not contain p-toluenesulfonylhydrazide.

In preferred embodiments of the present invention, the functionalized particulate bicarbonate comprises the bicarbonate ingredient and the at least one additive in powder form.

For certain applications it is preferred that the functionalized particulate bicarbonate of the present invention contains sodium bicarbonate as particles which are coated with a coating of additive. Such coating can improve some properties of the functionalized particulate bicarbonate. The additive in such instance may be termed a "coating agent". The additive as coating agent shall mean that this additive is able to cover, partly or completely, the surface of particles of bicarbonate. The "coating agent" is a different compound than bicarbonate ingredient from which the core of the particles are made of.

For certain applications, it is envisioned that the functionalized particulate bicarbonate of the present invention contains sodium bicarbonate co-milled with one additive. Such co-milling with the additive can improve some properties of the functionalized particulate bicarbonate.

For certain applications, the functionalized particulate bicarbonate of the present invention contains sodium bicarbonate as particles which are functionalized with more than one additive. The functionalization of the sodium bicarbonate particles may be carried out simultaneously with the additives using one functionalization method, or may be carried out sequentially using one additive with one functionalization method and then another additive with the same or different functionalization method. For example, sodium bicarbonate particles may be first functionalized with a first additive, and then these first-functionalized particles are again functionalized with a second additive (the second additive having the same composition or a different composition as the first additive, preferably having a different composition). The methods used for subsequent functionalizations may be the same, but preferably are different. The (first and second) functionalization methods are preferably selected from the group consisting of extrusion, co-grinding, and spray coating. For example, the first functionalization method may comprise or consist of co-grinding or extrusion, and the second functionalization method may comprise or consist of extrusion, co-grinding, or spray coating. Preferably, the first functionalization method may comprise or consist of co-grinding, and the second functionalization method may comprise or consist of extrusion.

For certain applications, the functionalized particulate bicarbonate of the present invention contains sodium bicarbonate as particles which are functionalized with one additive, but the additive is not added all at once, but added sequentially in several portions. For example, bicarbonate particles may be first functionalized with a first portion of the additive, and then these first-functionalized bicarbonate particles are again functionalized with a second portion of the same additive. The methods used for functionalization may be the same or may be different. For example, the (first and second) functionalization methods are preferably selected from the group consisting of extrusion, co-grinding, and spray coating. Preferably, the first functionalization method may comprise or consist of co-grinding, and the second functionalization method may comprise or consist of extrusion.

For certain applications, it may be preferred that the functionalized particulate bicarbonate of the present invention contains sodium bicarbonate as particles which are coated with a coating of a first additive, and then these coated particles are co-milled with a second additive (the second additive having the same composition or a different composition as the first additive).

For certain applications, the production of a fine cellular foam, so to produce a certain small amount of gas at one place, might be desirable. In order to improve the cellular foam structure it can be suitable that the functionalized particulate bicarbonate has a characteristic particle size and particle size distribution. The $D_{50}$ term is designating the diameter for which 50% by weight of the particles have a diameter less than or equal to $D_{50}$ (weight average diameter). The $D_{10}$ term is designating the diameter for which 10% by weight of the particles have a diameter less than or equal to $D_{10}$. The $D_{90}$ term is designating the diameter for which 90% by weight of the particles have a diameter less or equal to $D_{90}$.

The functionalized particulate bicarbonate may have advantageous properties, such as a low particle size preferably with a low span. The span of the particle size distribution is as known in the art defined as the ratio $(D_{90}-D_{10})/D_{50}$. The span may range from about 1 to about 6, such as from about 1 to about 3. In one embodiment the span may be lower than 6, preferably lower than 4, more preferably lower than 3. In one embodiment the span may be higher than 1, preferably higher than 2. In another embodiment the span may be lower than 1.8, more preferably at most 1.7 in particular at most 1.6, e.g. at most 1.5.

Preferably, the particles of the functionalized particulate bicarbonate have a particle size distribution of $D_{50}$ of at most 250 µm, preferably at most 100 µm, more preferably at most 60 µm, yet more preferably at most 40 µm, or at most 30 µm, or at most 25 µm.

In some embodiments, the particles of the functionalized particulate bicarbonate have a particle size distribution of $D_{50}$ of more than 1 µm, preferably more than 2 µm, more preferably more than 5 µm, yet more preferably at least 8 µm. This functionalized particulate bicarbonate is termed "functionalized micron-sized bicarbonate".

In some embodiments, the particles of the functionalized particulate bicarbonate have a $D_{10}$ in the range of 1 µm-160 µm, preferably in the range of 1 µm-10 µm, more preferably in the range of 2 µm-10 µm, yet more preferably in the range of 4 µm-8 µm, in particular 5 µm-6 µm.

In some embodiments, the particles of the functionalized particulate bicarbonate have a $D_{90}$ in the range of from 20 µm to 450 µm, preferably from 30 µm to 200 µm, more preferably from 30 µm to 165 µm, in particular from 30 µm to 100 µm.

The weight-average diameter $D_{50}$, as well as $D_{10}$ and $D_{90}$ values can be measured by laser diffraction and scattering on a Malvern Mastersizer S particle size analyser using an He-Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with bicarbonate (wet method).

The functionalized particulate bicarbonate shows excellent $CO_2$ release properties. As determined by TGA analysis, the maximum loss temperature of the functionalized particulate bicarbonate is preferably higher than the non-functionalized bicarbonate without additive. The $CO_2$ release of the functionalized particulate bicarbonate typically has its maximum at a temperature of at least 130° C., preferably at a temperature of at least 135° C., more preferably at a temperature of at least 140° C., even more preferably at a temperature of at least 145° C., and particularly preferably at a temperature of at least 155° C.

As determined by Differential Scanning Calorimetry (DSC) thermal analysis, the functionalized particulate bicarbonate preferably has the maximum peak temperature higher than the non-functionalized bicarbonate without additive. The DSC maximum peak temperature of the functionalized particulate bicarbonate may be at least 140° C., preferably at least 145° C., more preferably at least 150° C., even more preferably at a temperature of at least 155° C., and particularly preferably at a temperature of at least 160° C.

Functionalized Nano-Sized Bicarbonate

In some embodiments, the particles of the functionalized particulate bicarbonate have a particle size distribution of $D_{50}$ of at most 1 µm, preferably less than 1 µm. This functionalized particulate bicarbonate is termed "functionalized nano-sized bicarbonate".

In the instance when the functionalized particulate bicarbonate is based on nano-sized bicarbonate particles, it is preferred that the bicarbonate nano-sized particles are formed before functionalization. Techniques such as wet grinding with a solvent, micronisation and dry nanogrinding would be effective. Use of mills such as tumbler ball mills, planetary ball mills (for example available from Retch) or jet mills (for example available from Alpine) is suitable for making nano-sized bicarbonate particles. Ball milling involves decomposition of bulk solid materials into nanoscale regimes using a mechanical force. The reduction of particle size by high energy ball milling is termed as mechanical milling. Since milling a powder of bicarbonate powder to nanosize level generates quite a lot of heat, it is recommended to cool during the milling. Additionally, to facilitate the milling to nanosize level, it may be recommended to use a lubricant.

Additionally, to prevent particles from re-agglomerating during milling or after exiting the mill, it may be recommended to use a surfactant. These nano-sized particles have strong tendency to agglomerate owing to having large specific surface area. Surfactants may play an important role to prevent this close contact of the nano-sized particles by providing steric barrier and reducing surface tension. The surfactant molecules form a thin organic layer around the newly formed surfaces to protect the exposed surface from cold wielding when they come into contact with another surface during the milling process or when they exit the mill. A suitable surfactant may include a polymer such as poly (acrylic acid, sodium salt), or a fatty acid or ester thereof, such as oleic acid, stearic acid, oleic acid or oleylamine, palmitic acid, mysteric acid, undecanoic acid, octanoic acid, and/or valeric acid.

Because the functionalization adds another compound (additive) to the nanosized bicarbonate core particles, it is recommended to select a technique for additive deposition/incorporation (techniques being described in more detail below) which would not significantly increase the size of the initial bicarbonate core particles. It would be preferred for example for the particulate bicarbonate initially having a D50 of 1 µm or less before functionalization to generate after functionalization a functionalized particulate bicarbonate still in the nanosized range with a D50 of at most 1 µm or less. It is though acceptable in some instances that the functionalized particulate bicarbonate starting from nano-sized bicarbonate core particles may reach a D50 of 2 µm or less after functionalization.

Additive in Functionalized Particulate Bicarbonate

The additive in the functionalized particulate bicarbonate may comprise or consist of, as non-limiting examples, at least one following compound:
  one or more polymers;
  one or more amino acids, any derivative thereof, and salts thereof;
  one or more inorganic salts;
  one or more oils;
  one or more fats;
  one or more resin acids, any derivative thereof, and salts thereof;
  one or more fatty acids, any derivative thereof, and salts thereof;
  a carboxylic or polycarboxylic acid, derivative thereof (such as esters), or salts thereof;
  one or more soaps;
  one or more waxes; or
  any combinations thereof.

In some embodiments, the additive may comprise or consist of a polymer selected from the group consisting of polyvinylalcohol, polyglycol, polysaccharide, poly(meth)acrylic acid, poly(acrylic acid co-maleic acid, polyethylenenimine, polyvinylpyrrolidone, N-2(-Hydroxypropyl) methacrylamide, polyoxyalkylenes and derivatives thereof including polyethylene glycol, and combinations thereof.

In some embodiments, the additive may comprise or consist of a polysaccharide selected from the group consisting of hydrolyzed starch, carboxymethylcellulose, alginic acid and its salt, arabic gum, carrageenan; guar gum, locust bean gum, xantham gum and combinations thereof.

In some embodiments, the additive may comprise or consist of an amino acid, derivative thereof or salt thereof selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine and combinations thereof.

In some embodiments, the additive may comprise or consist of an inorganic salt selected from the group consisting of silicates (e.g., sodium silicate), NaCl, KCl, MgCl2, sodium phosphate, borates, nitrates, nitrites, sulfates, sulfites and combinations thereof.

In some embodiments, the additive may comprise or consist of:
  an amino acid, derivative thereof, or salt thereof,
  a polysaccharide (such as hydrolyzed starch, gums, carboxymethylcellulose),
  a resin acid, derivative thereof, or salt thereof,
  a fatty-acid, derivative thereof (such as esters), or salt thereof,
  a carboxylic or polycarboxylic acid, derivative thereof (such as esters), or salts thereof; or
  any combination thereof.

In some embodiments, the additive may comprise or consist of:
  a polymer (such as polyoxyalkylenes and derivatives thereof including polyethylene glycols, poly(meth)acrylates and derivatives thereof, polyvinylalcohol and polysaccharides, including modified, in particular hydrolyzed starch, maltodextrin and gum arabic),
  an amino acid, derivative thereof, or salt thereof (such as leucine),
  an oil (such as epoxidized soy bean oil),
  a resin acid, derivatives thereof, or salt thereof (such as rosin acid),
  a fatty acid, derivatives thereof, or salt thereof (such as stearic acid, lauric acid, linoleic acid and glycerol mono stearate),
  a wax (such as bees wax and carnauba wax), or,
  any combination thereof.

In some embodiments, the additive may comprise or consist of a compound which is capable of liberating CO2 and which is also used for functionalizing the particulate bicarbonate. This additive may be considered as a secondary blowing agent in the functionalized particulate bicarbonate. Not only this additive would provide an increase in the CO2 generation when the functionalized particulate bicarbonate is used as an endothermic blowing agent, but also this additive would protect the bicarbonate core from premature CO2 release by protecting its surface (or part thereof). This CO2-liberating additive may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred CO2-liberating additive may include at least one of:
fumaric acid,
tartaric acid, or
citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred CO2-liberating additive comprises or consists of citric acid, any ester thereof, or any salt thereof.

In some embodiments, the additive excludes citric acid, esters thereof, or salts thereof.

In some embodiments, the additive may comprise or may consist of an amino acid, a derivative thereof, or a salt thereof.

Generally, the amino acids are compounds as known in the art composed of an amino group and a carboxylic acid functional group. An amino group is, in accordance with IUPAC nomenclature a compound formally derived from ammonia ($NH_3$) by replacing one, two or three hydrogen atoms by hydrocarbyl groups, and having the general structures $RNH_2$ (primary amines), $R_2NH$ (secondary amines) or $R_3N$ (tertiary amines). In accordance with IUPAC nomenclature, derivatives of ammonium compounds ($NH_4^+)Y^-$ in which all four of the hydrogens bonded to the nitrogen have been replaced with hydrocarbyl groups, are considered as quaternary ammonium compounds which are not amines. That is, in the amino acids as used in accordance with the present invention the amine group, preferably the α-amine group, is a $RNH_2$, $R_2NH$ or $R_3N$ residue but not an $NR_4^+$ residue. Preferably, quaternary ammonium compounds comprising a carboxylic acid group are not used as amino acid additive in accordance with the present invention.

In a preferred embodiment of the invention, the amino acid used as additive is a β-amino acid or an α-amino acid, most preferred an α-amino acid. α-amino acids generally have a chemical structure according to formula (I)

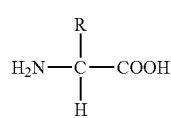

(I)

or a salt thereof. Residue R may be hydrogen, or an alkyl or an optionally substituted aryl or an optionally substituted heteroaryl group. Preferably, residue R is a $C_1$-$C_{10}$ alkyl group, in particular a $C_1$-$C_6$ alkyl group. Most preferably R is a methyl, propan-2-yl (isopropyl), butan-2-yl, or 2-methyl-propan-1-yl.

In a preferred embodiment, the α-amino acid is selected from the group consisting of positively charged amino acids, such as arginine, histidine, and lysine, negatively charged amino acids such as aspartic acid or glutamic acid, polar uncharged amino acids such as serine, threonine, asparagine or glutamine, or cysteine, selenocysteine, glycine and proline. Particular preferred are amino acids with hydrophobic side chain, such as alanine, valine, isoleucine, leucine, methionine, phenylalanine, tyrosine and tryptophan. Most preferred amino acids used as additives are valine, isoleucine and leucine, leucine being most preferred.

α-amino acids are chiral compounds. Generally, both racemic mixtures of the both enantiomeres can be used, as well as compositions enriched in one enantiomer, e.g. the D- or the L-enantiomer. Preferably, racemic mixtures of the amino acids may be used in accordance with one embodiment of the present invention.

Suitable derivatives of amino acids are for example esters, such as esters comprising a hydroxyalkyl residue, in particular a hydroxy $C_{1-20}$ alkyl residue. Alternatively or additionally the amino acid derivative may be an amide. Suitable salts are for example alkali metal and alkali earth metal salts or salts formed between an acid, such as an inorganic acid or a carboxylic acid with the amino group of the amino acid.

The amino acid should be present in the functionalized particulate bicarbonate according to the present invention in the amount of at least 0.02% by weight, preferably at least 0.05% by weight, in particular at least 0.1% by weight. More than 10% by weight of the amino acid in the functionalized particulate bicarbonate is disadvantageous for cost reasons. Preferably, at most 8% by weight, more preferably at most 6% by weight, in particular at most 5% by weight of the amino acid are present in the functionalized particulate bicarbonate in accordance with one embodiment of the present invention.

The preferred amino acid used as additive in the functionalized particulate bicarbonate is leucine. Leucine may for example be present in the functionalized particulate bicarbonate in an amount of 0.02% by weight to 5% by weight, preferably in an amount of 0.05% by weight to 2% by weight, more preferably in an amount of 0.05% by weight to 0.5% by weight.

In one embodiment the particulate bicarbonate being functionalized with an amino acid, in particular leucine, is prepared by spray-drying.

In additional or alternate embodiments, the additive in the functionalized particulate bicarbonate may comprise or consist of a resin acid, a derivative thereof, or a salt thereof.

Generally, the resin acid to be used as additive in the functionalized particulate bicarbonate is one of the resin acids as known in the art. The resin acids refer to mixtures of related carboxylic acids, preferably abietic acid, found in tree resins. Typically, resin acids have the basic skeleton of three fused rings with an empirical formula $C_{19}H_{29}COOH$. Preferred the resin acid is a tricyclic diterpene carboxylic acid, more preferable belonging to the abietane diterpene group. Preferred resin acids are abietic-type acids, e.g. selected from the group consisting of abietic acid (abieta-7,13-dien-18-oic acid), neoabietic acid, dehydroabietic acid, and palustric acid. Also suitable are pimaric-type acids, selected from the group consisting of pimaric acid (pimara-8(14),15-dien-18-oic acid), levopimaric acid, or isopimaric acid. Such acids are available from natural sources or via chemical synthesis as e.g. known from US 2014/0148572

A1. In the context of the present invention "abietic acid" is also referred to as "rosin acid".

A derivative containing resin acids that may be used in accordance with the present invention is tall oil. Tall oil (also called liquid rosin) is obtained as a by-product of the Kraft process of wood pulp manufacture. Crude tall oil contains rosin, resin acids (mainly abietic acids and its isomers), fatty acids (mainly palmetic, and oleic), fatty alcohols, sterols and alkyl hydrocarbon derivatives. Most preferred abietic acid, pimaric acid and their salts, in particular the sodium salts, respectively are used as additive in accordance with the present invention.

The resin acid, derivative thereof, or salt thereof should be present in the functionalized particulate bicarbonate according to the present invention in an amount of at least 0.02% by weight, preferably at least 0.05% by weight, in particular at least 0.1% by weight. The resin acid, derivative thereof, or salt thereof, such as rosin acid, may for example be present in an amount from 0.02% by weight to 25% by weight, preferably from 0.02% by weight to 20% by weight or from 0.1% by weight to 11% by weight, such as from 0.5% by weight to 10% by weight.

The preferred resin acid used as additive in the functionalized particulate bicarbonate is rosin acid, derivative thereof, or salt thereof. The rosin acid, derivative thereof, or salt thereof may for example be present in an amount from 1% by weight to 25% by weight, preferably from 5% by weight to 20% by weight in the functionalized bicarbonate.

In yet additional or alternate embodiments, the additive in the functionalized particulate bicarbonate may comprise or consist of a fatty-acid, derivative thereof (such as esters), or a salt thereof.

Fatty acids as used as additive in the present invention are those fatty acids as known in the art, i.e., a carboxylic acid with an aliphatic residue, which is either a saturated or unsaturated. Preferred, the fatty acid is a compound according to formula (II)

$$R\text{---}COOH \qquad (II)$$

wherein R is a saturated or unsaturated $C_6$-$C_{18}$ alkyl group, preferably a $C_{12}$-$C_{18}$ group, such as a $C_{12}$-$C_{16}$ alkyl group. The fatty acids may be used in form of their salts, in particular sodium or potassium salts, most preferably sodium salt. Even more preferred residue R is a $C_{16}$-$C_{18}$ alkyl group, most preferred, the fatty acid is a palmetic acid, linoleic acid, lauric acid or stearic acid, the latter being most preferred.

Examples of fatty acid derivatives are glycerides. Glycerides are esters formed from glycerol and fatty acids, in particular glycerol mono, di and tri fatty esters.

The preferred fatty acid used as additive in the functionalized particulate bicarbonate is stearic acid, an ester thereof, or a salt thereof. The more preferred fatty acid used as additive in the functionalized particulate bicarbonate is stearic acid, a stearate salt, or an ester of stearic acid, such as its ester with glycerol, such as tristearin, or glyceryl tristearate, which is a triglyceride derived from three units of stearic acid. Another preferred additive is glycerol mono stearate.

The fatty acid, derivative thereof, or salt thereof should be present in the functionalized particulate bicarbonate according to the present invention in an amount of at least 0.02% by weight, preferably at least 0.05% by weight, in particular at least 0.1% by weight. In certain embodiments the fatty acid, derivative thereof, or salt thereof may be present in the functionalized particulate bicarbonate in an amount of from 0.02% by weight to 30% by weight, preferably from 0.1% by weight to 10% by weight, more preferably from 0.5% by weight to 7% by weight.

In some embodiments, the additive may exclude stearic acid, an ester thereof, or salts thereof.

In yet more additional or alternate embodiments, the additive may comprise or consist of a polymer, such as a polymer selected from the group consisting of polyvinylalcohol, polyglycol, polysaccharide, poly(meth)acrylic acid, poly(acrylic acid co-maleic acid, polyethyleneimine, polyvinylpyrrolidone, N-2(-Hydroxypropyl) methacrylamide, polyoxyalkylenes and derivatives thereof including polyethylene glycols, and combinations thereof.

The polymer may be a natural or synthetic polymer. Natural polymers are polymers being from natural sources, such as starch and arabic gum. Natural polymers may also be modified, such as hydrolyzed starch.

Synthetic polymers are for example poly(meth)acrylates and derivatives thereof, polyoxyalkylenes and derivatives thereof including polyethylene glycols, and polyvinylalcohols. A preferred polyoxyalkylene derivative is for example a polymer offered under the trade name BYK 3155 by BYK-Chemie GmbH. Meth-/acrylic polymers may for example be anionic polymers with methacrylic acid as functional groups, cationic polymers with methylaminoethyl methacrylates as functional groups, meth-/acrylate copolymers with trimethyl-aminoethyl-methacrylate as functional groups and neutral polymers of meth-/acrylates which are available from Evonik under the trade name Eudragit®. Suitable Eudragit® grades are for example grades L, S, FS, E, RL, RS, NE and NM. Preferred are Eudragits® of grade RL, in particular Eudragit® RL 30D.

Polyethylene glycols are available in a wide range of different molecular weights. In one embodiment of the present invention low molecular weight polyethylene glycols having a molecular weight below 1000 g/mol can be used, preferably a polyethylene glycol having a molecular weight in the range of from 200 to 600 g/mol, such as in the range of from 300 to 500 g/mol, preferably PEG400. In another embodiment of the present invention a high molecular weight polyethylene glycol having a molecular weight of 1000 g/mol or above may be employed. Preferably the high molecular weight polyethylene glycol has a molecular weight of from 1000 to 10000 g/mol, more preferably from 2000 to 8000 g/mol, such as PEG4000.

In some embodiments, when a polysaccharide is used as additive in the functionalized particulate bicarbonate, the polysaccharide additive may be at least one polysaccharide selected from the group consisting of hydrolyzed starch, carboxymethylcellulose, alginic acid and salts thereof, arabic gum, carrageenan, guar gum, locust bean gum, xantham gum, and combinations thereof.

The additive in the functionalized particulate bicarbonate may comprise or consist of a polysaccharide selected from the group consisting of:

guar gums and their derivatives, in particular hydroxypropyl guar (such as Jaguar HP-105);

alginic acid and its salts, such sodium, calcium or copper (e.g., Kaltostat, Calginat, Landalgine, Kalrostat, Kel-acid, Vocoloid, Xantalgin); and carboxymethylcellulose (e.g., Aquaplast, Carmethose, CELLOFAS, Cellpro, Cellugel, Collowel, Ethoxose, Orabase, Lovosa).

In another embodiment the additive of the functionalized particulate bicarbonate may comprise or consist of a modified, in particular hydrolyzed starch or a compound comprising such starch. Particularly preferred additives of this class are hydrolyzed starch, arabic gum and maltodextrin, maltodextrin being particularly preferred. The polymer should be present in the functionalized particulate bicarbonate according to the present invention in an amount of at least 0.02% by weight, preferably at least 0.05% by weight, more preferably at least 0.1% by weight. In particular the hydrolyzed starch, arabic gum, maltodextrin, polyoxyalkylene derivatives including polyethylene glycols, poly(meth)acrylate, and polyvinylalcohol may for example be present in an amount of between 0.02% by weight to 40% by weight, more preferably from 0.1% by weight to 35% by weight, even more preferably from 1% by weight to 20% by weight, such as from 2% by weight to 10% by weight.

Oils used as additive in the present invention may be organic oils or mineral oils which may be of animal, vegetable, or petrochemical origin. Suitable oils are for example olive oil, maize oil, sunflower oil and soybean oil.

The oil may be chemically modified, such as epoxidized. A preferred oil is epoxidized soybean oil. The oil should be present in the functionalized particulate bicarbonate according to the present invention in an amount of at least 0.02% by weight, preferably at least 0.05% by weight, in particular at least 0.1% by weight. In preferred embodiments the oil can be present in the functionalized particulate bicarbonate in an amount of from 0.1% by weight to 10% by weight, more preferably from 1% by weight to 7% by weight.

In a further embodiment the additive in the functionalized particulate bicarbonate is a wax, such as bees wax or carnauba wax.

The wax should be present in the functionalized particulate bicarbonate according to the present invention in the amount of at least 0.02% by weight, preferably at least 0.05% by weight, in particular at least 0.1% by weight. The wax can for example be present in an amount of from 1% by weight to 30% by weight, preferably from 5% by weight to 25% by weight.

Additional information on particular properties of functionalized particulate bicarbonate can be found in WO2016/102591A1 by SOLVAY SA when the additive comprises or consists of an amino acid or salt thereof; in EP3037388A1 by SOLVAY SA when the additive comprises or consists of a resin acid or fatty acid as additive.

Method of Making Functionalized Particulate Bicarbonate

The present invention further relates to a method for making functionalized particulate bicarbonate.

The functionalized particulate bicarbonate may be prepared from a solution containing a bicarbonate ingredient or directly from an already-formed particulate bicarbonate.

The bicarbonate ingredient or particulate bicarbonate may comprise or consists essentially of ammonium bicarbonate, sodium bicarbonate, potassium bicarbonate, or mixtures thereof, in particular the bicarbonate ingredient or particulate bicarbonate comprises or consists essentially of sodium bicarbonate. The bicarbonate ingredient or particulate bicarbonate preferably comprises at least 80 wt % of sodium bicarbonate.

The functionalized particulate bicarbonate according to one aspect of the present invention may be obtained by encapsulation or coating processes.

In particular, another aspect of the present invention relates to a process for preparing functionalized particulate bicarbonate, preferably a functionalized particulate alkali metal bicarbonate as described above according to the invention by at least one of the following processes:

by spray-drying (also known as atomization), wherein the additive is dissolved in the bicarbonate-containing solution.

by grinding or co-grinding (also known as milling or co-milling) with the additive(s) in emulsion or powder form;
by spray coating and granulation within a fluidized bed,
by spray agglomeration within a fluidized bed,
by spray chilling (e.g., spray cooling, spray freezing),
by roller compaction, and/or
by extrusion, including simultaneous mixing/extrusion.

Spray-drying or drying by atomization is a drying technique. This method comprises spraying the product to be dried, which is in the form of a solution (or a suspension) in a stream of hot gas, so as to obtain a powder in a few seconds or fractions of seconds. The separation of a solution into fine droplets gives rise to a large material transfer surface and it leads to rapid evaporation of the solvent of the solution used.

Suitable apparatus for spray-drying are known in the art, and generally comprise several modules: a module comprising a circuit for storing and atomizing the solution comprising equipment for atomizing or spraying the solution, a module for the preparation of hot gas and its transfer to a drying chamber where it comes into contact with the sprayed solution, a drying chamber where the sprayed solution is evaporated and the particles are formed, and a module for collecting the particles, generally comprising a cyclone and/or a suitable filter.

Generally, the equipment for atomizing or spraying the solution is a compressed gas sprayer or a dispersion turbine. Also ultrasound nozzles can be used for spraying the solution.

In the spray-drying process of the invention generally an aqueous solution of the bicarbonate is used. While other polar solvents or mixtures of polar solvents, for examples mixtures of water and ethanol, in which the additive is soluble, may be used, water is the preferred solvent.

In the spray-drying method of the present invention the aqueous solution to be spray-dried comprises 1 to 10% by weight of the bicarbonate ingredient. The bicarbonate ingredient in the solution is preferably an alkali metal bicarbonate. The solution to be spray-dried further comprises 1 to 10,000 ppm of an additive or salt thereof. The additive used is preferably one of those as described above for the particulate bicarbonate of the present invention. In preferred embodiments, the content of the additive in the solution to be spray-dried is 1 to 5,000 ppm, more preferred 1 to 3,000 ppm, in particular 10 to 2,000 ppm, e.g. 50-1,000 ppm of additive per kg of solution to be spray-dried. Generally, the aqueous solution comprises at least 1 mg, preferably at least 5 mg, more preferably at least 10 mg, even more preferred at least 100 mg of the additive per kg of aqueous solution. Generally, the aqueous solution comprises at most 2,000 mg, preferably at most 1,500 mg, more preferably at most 1,200 mg of the additive per kg of aqueous solution. In case of salts, weight percentages are given based on the free base/acid.

Generally, in the spray-drying process in the method for making functionalized particulate bicarbonate, the aqueous solution comprises at least or more than 1%, preferably at least or more than 2%, more preferably at least or more than 3%; even more preferably at least or more than 4%, in particular at least or more than 5% by weight of the bicarbonate ingredient. Preferably, the bicarbonate ingredient comprises or consists essentially of sodium bicarbonate and/or potassium bicarbonate, in particular comprise or consists essentially of sodium bicarbonate. A high concentration of the bicarbonate ingredient in the aqueous solution is detrimental as leading to high speed plugging of the spraying or atomizing device. Therefore it is generally recommended that the aqueous solution comprises at most or less than 10% by weight, preferably at most or less than 8% by weight, more preferably at most or less than 6% by weight of the bicarbonate ingredient, in particular sodium bicarbonate. Preferably, the bicarbonate-containing solution is an aqueous solution comprising 1%-10%, advantageously 3%-8%, more advantageously 4%-8% by weight, such as 4%-6% by weight of the bicarbonate ingredient, in particular sodium bicarbonate.

The drying with a hot gas breaks part of the alkali metal bicarbonate down into the form of sodium carbonate, $CO_2$ and water. In one advantageous embodiment of the present invention, the spray-drying is carried out in a gas comprising at least 5%, advantageously at least 10%, more advantageously at least 20%, and even more advantageously at least 30% of $CO_2$ by volume on a dry gas bases. This enables to limit the bicarbonate decomposition into carbonate solid and $CO_2$ gas and water vapor. Generally, the spray-drying is carried out with a gas preheated between 40° C. and 220° C. Advantageously the spray-drying is carried out in a spray-drying chamber and wherein the gas is preheated before being introduced into the spray-drying chamber at least 40° C., preferably at least 50° C., more preferably at least 60° C., even more preferably at least 70° C. Also advantageously, the gas is preheated before being introduced into the spray-drying chamber at most 220° C., preferably at most 200° C., more preferably at most 180° C., even more preferably at most 130° C.

It is preferable for the temperature of the gas after the spray-drying operation to be at most 80° C., advantageously at most 70° C. and more advantageously at most 60° C.

In one embodiment in the method for making functionalized particulate bicarbonate, the aqueous solution is preheated to a temperature of at least 20° C. and preferably at most 80° C. before being sprayed during the spray-drying operation. In one particular embodiment, the aqueous solution is preheated to a temperature of at least 20° C. and at most 25° C. before being sprayed during the spray-drying operation.

The method for making functionalized particulate bicarbonate according to the present invention may comprise co-grinding of the bicarbonate ingredient in the presence of the additive, such as in the presence of 0.02 to 10 parts by weight of an additive per 100 parts per weight of the substance undergoing co-grinding. The bicarbonate ingredient and the additive are preferably as defined above.

In the process for preparing the functionalized particulate bicarbonate by co-grinding, all suitable grinding procedure as known in the art can be used.

Typical devices include impact mills, which are mills in which the material be milled as subjected to the impact of moving mechanical part and that have the effect of fragmenting the particles of the material. Impact mills are well-known in the fine milling art. Such mills include hammer mills, spindle mills, attritor mills, jet mills, ball mills, such as planetary ball mills, and cage mills. Such mills are e.g. manufactured and available by Grinding Technologies and System SRL or by Hosokawa Alpine AG. Most preferred, an Alpine LGM 3 is used. In the process for preparing the alkali metal bicarbonate particles, the alkali metal bicarbonate is grinded in the presence of the additive, i.e. the amino acid as defined above. Either the total amount of bicarbonate and additive is added into the mill at once, followed by milling or preferably the bicarbonate and the additive are fed into the milling device at a constant rate. Suitable rates for the bicarbonate are 50 kg/h to 500 kg/h, preferably 100 kg/h to 400 kg/h, e.g. about 150 kg/h. The amount of additive corresponds to the weight ratio of the bicarbonate ingredient and additive used. For examples, if the bicarbonate ingredient is co-grinded in the presence of 1 part by weight of an additive, per 100 parts by weight of the substance undergoing co-grinding, the feeding rate of the additive is only 1% of the feeding rate of the bicarbonate ingredient.

The amount of additive (e.g., polymer, resin acid, fatty acid, carboxylic acid, amino acid, derivatives thereof, or salts thereof, or combinations thereof) in the process for preparing the functionalized particulate bicarbonate by co-grinding, is from 0.02 to 10 parts by weight per 100 parts by weight of the substance undergoing co-grinding. Below 0.02 parts by weight, there is only low efficacy of the additive. Using higher amounts than 10 parts by weight of the additive is disadvantageous for cost reasons. Preferred amounts are 0.2-8 parts by weight of the additive, more preferred 0.5-5 parts by weight of additive, even more preferred 0.8-2 parts by weight of additive, in particular about 1 part by weight of additive, each per 100 parts by weight of the substance (typically the bicarbonate ingredient and the at least one additive) undergoing co-grinding.

In some embodiment, the method for making functionalized particulate bicarbonate according to the present invention may comprise spray coating, for example within a fluidized bed. Spray coating within a fluidized bed is a technique in which a powder (solid particles of the bicarbonate ingredient) is fed into a fluidization chamber. A gas fluidizes the powder from the chamber bottom through a grid. A liquid which comprises the additive in dissolved form, in a melted form, and/or in dispersed solid form (for example a solution, an emulsion, a suspension, a melt, a melt emulsion or a melt suspension) is sprayed into the fluidized powder to apply a layer or coating onto particles.

In some embodiment, the method for making functionalized particulate bicarbonate according to the present invention may comprise spray granulation, for example within a fluidized bed. The fluidized bed spray granulation is a method for making free-flowing granulate from liquids. The liquid containing solids, such as aqueous solutions, emulsions, suspensions, melts, melts emulsions or melts suspensions, is sprayed into a fluidized bed system. The solids are preferably bicarbonate particles. Due to the high heat exchange the aqueous or organic solvent in the liquid evaporates immediately, and the solids form small particles as starter cores. These are sprayed with another liquid with contains the additive (solution/suspension). A gas fluidizes the additive solution/suspension sprayed into a chamber. After evaporation and drying in the fluidized bed, the dried additive forms a hard coating around the starter core. This step is continuously repeated in the fluidized bed so that the granulate grows to form onion-like or blackberry-like structures. An onion-like structure is obtained from layer by layer coating. Alternatively, a defined volume of suitable starter cores can be provided. In this option, the liquid only serves as a vehicle for the solids that are being applied.

In some embodiment, the method for making functionalized particulate bicarbonate according to the present invention may comprise spray agglomeration, for example within a fluidized bed. Spray agglomeration within a fluidized bed is a technique in which a powder or a fine granulate is fed into a fluidization chamber. A gas fluidizes the powder from the chamber bottom through a grid. A liquid (either a solution, an emulsion, a suspension a melt, a melt emulsion or a melt suspension), which acts as a binder, is sprayed on the fluidized particles. Liquid bridges are created that form agglomerates from the particles. Spraying continues until the desired size of the agglomerates is reached.

In some embodiment, the method for making functionalized particulate bicarbonate according to the present invention may comprise spray chilling (or spray cooling, spray freezing). Spray chilling is a technique in which a melt, a melt emulsion or a melt suspension is sprayed into a fluidization chamber. A cold gas in injected in the fluidization chamber. The solidification of solid particles is achieved by the melt droplets losing heat to cold air in the fluid bed.

In some embodiment, the method for making functionalized particulate bicarbonate according to the present invention may comprise roller compaction. Roller compaction is a technique in which powder particles are made to adhere to each other by applying a force onto the powder, which causes a considerable size enlargement. The powder is compacted between two counter rotating rolls to apply a force. The obtained briquettes, flakes or ribbons are crushed out of the rolls to reach a desired particle size.

In some embodiment, the method for making functionalized particulate bicarbonate according to the present invention may comprise extrusion (or mixing extrusion). Extrusion (or mixing extrusion) is a technique in which a powder or another material is pushed through a die of a fixed cross-section. A screw, two screws or a succession of paddles may help pushing the material through mixing, degassing and homogenizing phases. Temperature control along the distance allows for phase changing, melting, crystallization, chemical reaction, coating or granulating the materials.

Use of the Functionalized Particulate Bicarbonate

The present invention further relates to the use of the herein described functionalized particulate bicarbonate as chemical blowing agent for foaming
  a thermoplastic polymer, for example PVC plastisol; or
  a polymer resin in an extrusion process.

Chemical Blowing Agent

The present invention further relates to a chemical blowing agent for foaming
  a thermoplastic polymer; or
  a polymer resin in an extrusion process.

Thus, another aspect of the invention provides a chemical blowing agent for foaming a thermoplastic polymer which comprises the functionalized particulate bicarbonate as described in the various embodiments herein, wherein the functionalized particulate bicarbonate contains at least one additive as described in the various embodiments herein.

In some embodiments, the chemical blowing agent for foaming a thermoplastic polymer comprises a functionalized particulate bicarbonate having a particle size D50 of 1000 nm or less.

In alternate embodiments, the chemical blowing agent for foaming a thermoplastic polymer comprises a functionalized particulate bicarbonate having a particle size D50 more than 1 micron and up to 250 µm, preferably up to 30 µm, or up to 25 µm.

The additive in the functionalized particulate bicarbonate may comprise or consist of, as non-limiting examples, at least one following compound:
  one or more polymers;
  one or more amino acids, any derivative thereof, and salts thereof;
  one or more inorganic salts;
  one or more oils;
  one or more fats;
  one or more resin acids, any derivative thereof, and salts thereof;
  one or more fatty acids, any derivative thereof, and salts thereof;
  a carboxylic or polycarboxylic acid, derivative thereof (such as esters), or salts thereof
  one or more soaps;
  one or more waxes; or
  any combinations thereof.

Any particular embodiments for the functionalized particulate bicarbonate and the additive(s) used for its functionalization described herein are applicable here.

In some embodiments, the chemical blowing agent does not contain a compound which liberates nitrogen gas during heating.

In some embodiments, the chemical blowing agent does not contain a compound which liberates ammonia during heating.

In preferred embodiments, the chemical blowing agent is an endothermic chemical blowing agent comprising the functionalized particulate bicarbonate as described in the various embodiments herein.

In preferred embodiments, the chemical blowing agent does not contain an exothermic blowing agent.

In some embodiments, the chemical blowing agent comprises the functionalized particulate bicarbonate and further comprises a second compound as another blowing agent.

The second compound is preferably an endothermic blowing agent.

The second compound preferably can liberate $CO_2$ upon heating. This second compound preferably increases the $CO_2$ generation which is already formed by the decomposition of the functionalized particulate bicarbonate upon heating.

This $CO_2$-liberating second compound acting as blowing agent may be a carboxylic or polycarboxylic acid, derivative thereof (such as esters), or salts thereof.

Suitable carboxylic acids include those of the formula: HOOC—R—COOH where R is an alkylene group of 1 to about 8 carbon atoms which may also be substituted by one or more hydroxy groups or keto groups and may also contain unsaturation. Also included are esters, salts and half salts.

A preferred $CO_2$-liberating second compound acting as blowing agent may include at least one of:
  fumaric acid,
  tartaric acid, or
  citric acid, citrates (such as sodium hydrogen citrate, disodium citrate), or esters of citric acid.

Esters of citric acid may include tributyl citrate, triethyl citrate, tri-C12-13 alkyl citrate, tri-C14-15 alkyl citrate, tricaprylyl citrate, triethylhexyl citrate, triisocetyl citrate, trioctyldodecyl citrate and triisostearyl citrate, isodecyl citrate and stearyl citrate, dilauryl citrate, and/or ethyl citrates (mixture of tri-, di- and monoesters), preferably tributyl citrate, triethyl citrate, isodecyl citrate, or triethylhexyl citrate.

A more preferred $CO_2$-liberating second compound acting as endothermic blowing agent comprises or consists of citric acid, esters therof, or salts thereof.

Functionalized Second Compound in Blowing Agent Composition

It is also envisioned that the $CO_2$-liberating second compound in the blowing agent composition which supplements $CO_2$ generation may also be in a functionalized particulate form. This functionalized particulate second compound would comprise an additive as described herein in relation to the functionalized particulate bicarbonate. This functionalization of the particulate second compound may also use one or more techniques as described above in relation to the making of the functionalized particulate bicarbonate.

In some embodiments, the endothermic blowing agent comprises, or consists essentially of, or consists of:
- the functionalized particulate bicarbonate, as described herein in the various embodiments; and
- a functionalized particulate carboxylic or polycarboxylic acid, derivative thereof (such as esters), or salts thereof.

In particular embodiments, the endothermic blowing agent comprises, or consists essentially of, or consists of:
- the functionalized particulate bicarbonate, as described herein in the various embodiments; and
- a functionalized particulate carboxylic or polycarboxylic acid, derivative, or salt thereof, selected from the group consisting of: fumaric acid, tartaric acid, citric acid, salts thereof (such as sodium hydrogen citrate, disodium citrate), esters thereof, and any combination thereof.

In some embodiments, the chemical blowing agent for foaming a thermoplastic polymer comprises a functionalized particulate bicarbonate and a functionalized particulate second compound (e.g., functionalized carboxylic or polycarboxylic acid, derivative, or salt thereof), both having a particle size D50 of 1000 nm or less.

In alternate embodiments, the chemical blowing agent for foaming a thermoplastic polymer comprises a functionalized particulate bicarbonate and a functionalized particulate second compound (e.g., functionalized carboxylic or polycarboxylic acid, derivative, or salt thereof), both having a particle size D50 more than 1 micron and up to 250 microns, preferably up to 30 microns.

In yet alternate embodiments, the chemical blowing agent for foaming a thermoplastic polymer comprises a functionalized particulate bicarbonate having a particle size D50 of 1000 nm or less and a functionalized particulate second compound (e.g., functionalized carboxylic or polycarboxylic acid, derivative, or salt thereof) having a particle size D50 more than 1 micron and up to 250 microns, preferably up to 30 microns.

In embodiments where the endothermic blowing agent comprises the functionalized particulate bicarbonate and the functionalized particulate second compound (e.g., functionalized carboxylic or polycarboxylic acid, derivative, or salt thereof), the method for making such blowing agent may contain the following steps:
- A/ making the functionalized particulate bicarbonate using a first additive (wherein the first additive is selected from those defined herein); separately making the functionalized particulate second compound using a second additive (wherein the second additive is selected from those defined herein); mixing the functionalized particulate bicarbonate and the functionalized particulate second compound to make the endothermic blowing agent; or
- B/ mixing the particulate bicarbonate and the particulate second compound before functionalization to make a non-functionalized particulate mixture; and functionalizing the non-functionalized particulate mixture using at least one additive (as defined herein) to make the endothermic blowing agent.

In the method A/, the first and second additives may be the same or may be different. The techniques to make the functionalized particulate bicarbonate and the functionalized particulate second compound may be the same or may be different.

In the method B/, the additive and the technique for functionalization of the particulate bicarbonate and the particulate second compound is generally the same, thus resulting in less flexibility in the making of the endothermic blowing agent. However this method would be more cost effective.

Foamable Polymer Composition

Another aspect of the present invention relates to a foamable polymer composition comprising
- a) a polymer;
- b) the functionalized particulate bicarbonate used as chemical blowing agent for foaming; and
- c) at least one polymer additive.

The foamable polymer composition may optionally comprise a functionalized particulate second compound used as supplemental chemical blowing agent for foaming (as described herein).

The foamable polymer composition may optionally comprise a foam stabilizer, such as a silicone based foam stabilizer.

The amount of the polymer in the foamable polymer composition typically ranges between about 10 wt % (or 20 wt %) and about 90 wt % based on the total weight of the foamable polymer composition. The amount of polymer can be selected according to the desired final characteristic of the foamable polymer composition.

In one preferred embodiment according to the present invention, the foamable polymer composition is in the form of a plastisol. The term "plastisol" relates to a suspension of polymer particles in a liquid plasticiser.

Preferably, the plastisol is a suspension of polyvinyl chloride particles in a liquid plasticizer. The choice of the plasticizer is not particularly limited and, therefore, commonly employed plasticizers, such as dioctylphtalate or 1,2-cyclohexyldicarbonic acid diisononyl ester can be used for this purpose.

The terms "polyvinyl chloride" intend to designate vinyl chloride homopolymers as well as copolymers of vinyl chloride with other ethylenically unsaturated monomers which are either halogenated (chloroolefins like vinylidene chloride; chloroacrylates; chlorinated vinylethers) or non halogenated (olefins like ethylene and propylene; styrene; vinylethers like vinyl acetate) monomers; as well as vinyl chloride copolymers with acrylic and methacrylic acids; esters, nitriles and amides. Vinyl chloride homopolymers and vinyl chloride copolymers containing 50-99 weight %, preferably 60-85 weight % of vinyl chloride are preferred.

The amount of the plastisol in the foamable polymer composition typically ranges between about 20 wt % and about 90 wt % based on the total weight of the foamable polymer composition. The amount of plastisol can be selected according to the desired final characteristic of the foamable polymer composition.

The amount of the functionalized particulate bicarbonate in the foamable polymer composition typically ranges from 5 to 15 parts per 100 parts by weight of polymer. For example, for a foamable PVC polymer composition, the amount of the functionalized particulate bicarbonate in the foamable PVC polymer composition typically ranges from 5 to 15 parts per 100 parts by weight of PVC resin, preferably from 6 to 12 parts per 100 parts by weight of PVC resin; more preferably from 7 to 11 parts per 100 parts by weight of PVC resin or from 8 to 10 parts per 100 parts by weight of PVC resin.

The foamable polymer composition of the present invention may contain further components, for instance, foam stabilizers; air release agents; fillers or extenders (e.g., $CaCO_3$ as a filler), such as carbon black; other polymers and oils; curing agents, such as sulfur compounds and various chemicals that act as a part of a curing system, such as zinc oxide; antistatic agents; biocides; colorants; coupling agents; fibrous reinforcements; flame retardants; fungicides; heat stabilizers; lubricants; mold release agents; plasticizers (e.g., DINP=di-isononyl phtalate); preservatives; processing aids; slip agents; ultraviolet stabilizers; viscosity depressants; and any other ingredient that may be a desirable component of the resulting foamed polymer.

A preferred foam stabilizer may include a silicone based foam stabilizer, such as BYK 8020 for PVC plastisol.

In some embodiments, the foamable composition does not contain another blowing agent other than the functionalized particulate bicarbonate.

In other embodiments, the foamable composition does not contain any blowing agent which is exothermic. In particular embodiments, the foamable composition does not contain a blowing agent which liberates nitrogen gas and/or ammonia. Examples of blowing agents which liberate nitrogen gas are exothermic blowing agents such as azodicarbonic acid diamide (azodicarbonamide, ADC, ADCA, CAS No. 123-77-3), the sulfonhydrazides 4,4'-oxybis(benzenesulfonylhydrazide) (OBSH, CAS No. 80-51-3) and p-toluenesulfonylhydrazide, (TSH, CAS No. 1576-35-8).

In preferred embodiments, the foamable polymer composition does not contain azodicarbonamide.

In alternate or additional preferred embodiments, the foamable polymer composition does not contain benzenesulfonylhydrazide.

In alternate or additional embodiments, the foamable polymer composition does not contain p-toluenesulfonylhydrazide.

Process for Preparing the Foamable Composition

Another aspect of the present invention relates to a process for preparing the foamable polymer composition as described above, wherein the process comprises:

mixing the components of the foamable polymer composition as provided herein, wherein a component of the foamable polymer composition is the functionalized particulate bicarbonate.

The process for preparing the foamable polymer composition can be carried out in conventional equipment, for example made of Austenitic Stainless Steel (304L-316L etc). The process can also be carried out in non-metallic materials like plastics, glass and ceramics for chemical use.

Preferably, the mixing step in the process is carried out under continuous mixing. Because the foamable polymer composition has a relatively high viscosity, a powerful mixing is required for obtaining a homogeneous foamable polymer composition. Moreover, because the blowing effect already starts taking place during the mixing, the speed of mixing should be sufficiently high in order to achieve a good homogenisation within a short period of time. Preferably, the homogenisation is achieved within less than about 20 seconds during the mixing step(s) of the process. The selection of the mixing conditions depends upon the specific characteristics of the equipment. The mixing step(s) of the process for preparing the foamable polymer composition can be carried out at any suitable temperature as in conventional foam production, the process can for example be carried out at relatively low temperatures (ambient) ranging between about 0° C. and about 30° C., for instance at about 20-25° C.

For example, a PVC plastisol composition may be prepared by mixing
the functionalized particulate bicarbonate in powder form as described herein,
at least one plasticizer,
at least one polyvinyl chloride polymer,
optionally a foam stabilizer; and
optionally one or more polymer additives such an inorganic filler.

A preferred foam stabilizer may include a silicone based foam stabilizer, such as BYK 8020 for PVC plastisol.

The components of the PVC plastisol composition may be dispersed on a high speed mixer and then de-aerated under vacuum.

The PVC plastisol composition may optionally comprise a functionalized particulate second compound used as supplemental chemical blowing agent for foaming (as described herein). The functionalized particulate second compound may be a functionalized particulate carboxylic or polycarboxylic acid, derivative, or salt thereof.

The functionalized particulate second compound may be selected from the group consisting of: fumaric acid, tartaric acid, citric acid, salts thereof (such as sodium hydrogen citrate, disodium citrate), esters thereof, and any combination thereof.

Process for Preparing a Foamed Polymer

A further aspect of the present invention relates to a process for preparing a foamed polymer, wherein the above described foamable polymer composition is heated. Thus, the process for preparing a foamed polymer can comprise the following step:
mixing the components of the foamable polymer composition as provided herein; and
heating the foamable polymer composition obtained from mixing.

Preferably, the heating step is carried out immediately after the completion of the mixing step.

The process for preparing a foamed polymer may include a shaping step such as extrusion or spreading. Preferably, the heating step is carried out immediately after the completion of the mixing and shaping steps.

The heating step can be carried out at a temperature from about 120° C. and up to about 220° C., or from about 120° C. and up to about 210° C., or from about 120° C. and up to about 200° C., depending on the resin and the composition of plastisol.

The time of heating in the heating step depends on the formulation of plastisol, shape of the material, temperature and the like. In the a process for preparing a foamed polymer from the above-mentioned foamable polymer composition, the gelation time during the heating period in the presence of the functionalized particulate bicarbonate as the blowing agent is less than that in the presence of azodicarbonamide as the blowing agent (while all other components remain the same).

When foamable polymer composition comprises the functionalized particulate bicarbonate, the gelation time at temperature above glass transition temperature Tg and/or above melting temperature Tm of the polymer preferably is less than 180 seconds, such as less than 125 seconds, in particular less than 90 seconds, preferably 80 seconds or less, or 70 seconds or less, or more preferably 60 seconds or less.

Regarding a PVC plastisol, the resulting liquid PVC paste (plastisol) can be spread coated at a certain thickness on a surface (for example, a paper, in particular a silicone paper) and heated in an oven (e.g., Thermosol Werner Mathis) set at a curing (gelation) temperature (generally between 150°

C. and 210° C. or 200° C., such as from 180° C. to 210° C., or from 185° C. to 210° C., or from 190° C. to 210° C., or from 200° C. to 210° C.) for a time of 130 seconds or less, such as for a time of 120 seconds to 30 seconds, preferably for a time of 120 seconds to 60 seconds, more preferably for a time of 120 seconds to 90 seconds.

Generally the time at which the plastisol is held at the gelation temperature depends on the foaming agent used. For some foaming agents shorter gelation times can be of advantage, such as for amino acids and in particular leucine as blowing agent where polymer foams of good experience and expansion rate are obtained at rather short gelation times of below 100 seconds, in particular below 80 seconds, such as in the range of 50 to 70 seconds. For bicarbonate particles being functionalized with an amino acid good results at a short time are also in particular achieved if the gelation temperature is rather low, such as below 200° C., in particular in the range of 175 to 195° C. If stearic acid is used as additive in the functionalized particulate bicarbonate of the present invention the same gelation times and gelation temperatures as for amino acid additives are preferred.

For some embodiments of a process for manufacturing a PVC polymer, when the foamable polymer composition is heated, the temperature suitable for liberating CO2 gas from the functionalized particulate sodium bicarbonate and melting a PVC polymer may be from 190 to 210° C., preferably from 200 to 210° C., during a gelation time from 90 seconds to 120 seconds at a temperature to provide a foamed PVC polymer.

When the foamable polymer composition is spread coated on a surface before heating and polymer melting, the foamed polymer may have an expansion ratio of at least 270, preferably at least 280, more preferably at least 300 and/or has a density of less than 0.6 g/cm$^3$, preferably less than 0.55 g/cm$^3$, more preferably at most 0.5 g/cm$^3$. The expansion ratio is calculated based on the ratio of a final thickness over an initial thickness of a spread coated layer of the foamable polymer composition as that layer gets heated in an oven.

Foamed polymeric products produced using the blowing agent and the above discussed foamable polymer composition can be made by processes that involve extrusion, calendering, injection molding, coating, expansion casting or rotational molding.

Foamed Polymer

A further aspect of the present invention relates to a foamed polymer, wherein the foamed polymer is obtainable from the foamable composition as described above.

In one embodiment of the invention, the foamed polymer is a flexible foamed polymer. In this embodiment, the foamed or extruded polymer is preferably flexible polyvinyl chloride and can be advantageously used for flooring applications;
for production of wall paper foam based;
as artificial leather; or
as technical foam.

The functionalized particulate bicarbonate is preferably used as a blowing agent for foamed or extruded polymers (such as foamed PVC or polyurethanes; extruded PVC, polyolefins, polyamides), preferably used as an endothermic blowing agent. Non-limiting examples of polymers are polyvinyl chloride (PVC), polyurethanes, polyolefins (PO, PE, PP), styrenics (PS, ABS, ASA, SAN), engineering resins, polyphenylene oxide, polyamides, polyimides, and natural and synthetic rubber such as nitrile butadiene rubber (NBR) or chloroprene rubber (CR).

When the foamable polymer composition is spread coated on a surface before heating and polymer melting, the foamed polymer may have an expansion ratio of at least 270, preferably at least 280, more preferably at least 300. The expansion ratio is calculated based on the ratio of a final thickness over an initial thickness of a spread coated layer of the foamable polymer composition as that layer gets heated in an oven. The expansion ratio may be from 270 up to 450, or from 280 up to 445, or from 290 up to 440, or from 300 up to 440.

In some embodiments, the foamed polymer is a PVC foam with a density of less than 0.65 g/cm$^3$ or of less than 0.6 g/cm$^3$, preferably less than 0.58 g/cm$^3$, more preferably at most 0.55 g/cm$^3$, most preferably at most 0.5 g/cm$^3$ or at most 0.45 g/cm$^3$. In some embodiments in which a PVC foam is made from a foamable PVC composition containing a functionalized particulate bicarbonate with at least one additive, the PVC foam has a density from 0.3 to 0.65 g/cm$^3$, preferably a density from 0.33 to 0.58 g/cm$^3$, more preferably a density from 0.33 to 0.5 g/cm$^3$ or even a density from 0.33 to 0.45 g/cm$^3$. The additive is preferably selected from the group consisting of beeswax, carnauba wax, glycerol mono stearate, poly(meth)acrylate, epoxidized soybean oil, arabic gum, linoleic acid, maltodextrin, polyvinyl alcohol, lauric acid, rosin acid, starch, stearic acid, a polyoxyethylene compound (like BIK3155, polyethylene glycol e.g., PGE400, PEG4000), leucine, and any combination of two or more thereof.

The present invention is based on the discovery of the effects of the additive mentioned in the present specification, for which the different variants of the method and/or of the product obtained by said variants of the method are described in more detail below.

Item 1.

A chemical blowing agent for foaming a thermoplastic polymer precursor, for example PVC plastisol or a polymer resin in an extrusion process,
said chemical blowing agent comprising a functionalized particulate bicarbonate,
wherein said functionalized particulate bicarbonate contains at least one additive,
wherein the chemical blowing agent does not contain a compound which liberates nitrogen gas during heating; and
wherein said additive in the functionalized particulate bicarbonate is at least one following compound:
one or more polymers;
one or more amino acids, any derivative thereof, and salts thereof;
one or more inorganic salts;
one or more oils;
one or more fats;
one or more resin acids, any derivative thereof, and salts thereof;
one or more fatty acids, any derivative thereof, and salts thereof;
a carboxylic or polycarboxylic acid, derivative thereof (such as esters), or salts thereof;
one or more soaps;
one or more waxes; or
any combinations thereof.

Item 2.

The chemical blowing agent according to ITEM 1, wherein the additive in the functionalized particulate bicarbonate is at least one compound selected from the group consisting of an amino acid, derivative thereof, or salt thereof, preferably at least one compound selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine and combinations thereof, more preferably leucine.

Item 3.

The chemical blowing agent according to ITEM 1, wherein the additive in the functionalized particulate bicarbonate is at least one compound selected from the group consisting of a fatty acid, derivative thereof (such as ester), or salt thereof.

Item 4.

The chemical blowing agent according to any of ITEMS 1 to 3, wherein the functionalized particulate bicarbonate comprises sodium bicarbonate.

Item 5.

The chemical blowing agent according to any of ITEMS to 4, wherein the functionalized particulate bicarbonate comprises at least 50% by weight and less than 100% by weight of the bicarbonate component, and from 50% or less to 0.02% by weight of said additive.

Item 6.

The chemical blowing agent according to any of ITEMS 1 to 5, wherein the functionalized particulate bicarbonate comprises at least 90% by weight and less than 100% by weight of the bicarbonate component, and from 10% or less to 0.02% by weight of said additive.

Item 7.

The chemical blowing agent according to any of ITEMS 1 to 6, wherein the particles of the functionalized particulate bicarbonate have a particle size distribution of $D_{50}$ of more than 1 µm and at most 25 µm.

Item 8.

The chemical blowing agent according to any of ITEMS 1 to 6, wherein the particles of the functionalized particulate bicarbonate have a particle size distribution of $D_{50}$ of at most 1 µm.

Item 9.

The chemical blowing agent according to any of ITEMS 1 to 8, wherein the functionalized particulate bicarbonate obtained by at least one of the following processes:
  by spray-drying (also known as atomization), wherein the additive is dissolved in the bicarbonate-containing solution.
  by grinding or co-grinding (also known as milling or co-milling) with the additive(s) in emulsion or powder form;
  by spray coating and granulation within a fluidized bed,
  by spray agglomeration within a fluidized bed,
  by spray chilling (e.g., spray cooling, spray freezing),
  by roller compaction, and/or
  by extrusion, including simultaneous mixing/extrusion.

Item 10.

The chemical blowing agent according to any of ITEMS 1 to 9, further comprising an second compound which liberates CO2 upon heating, said second compound being selected from the group consisting of a carboxylic or polycarboxylic acid, derivative thereof (such as esters), or salts thereof.

Item 11.

The chemical blowing agent according to ITEM 10, wherein said second compound is functionalized with at least one additive which is different or the same as the one in the functionalized particulate bicarbonate.

Item 12.

The chemical blowing agent according to ITEM 10 or 11, wherein said second compound is at least one of:
  fumaric acid,
  tartaric acid,
  citric acid, citrates (such as sodium hydrogen citrate, disodium citrate), or esters of citric acid; or combination thereof.

Item 13.

A foamable polymer composition, comprising a polymer, optionally a foaming stabilizer, and the chemical blowing agent according to ITEMS 1 to 12.

Item 14.

The foamable polymer composition according to ITEM 13, wherein the polymer is a PVC, a polyurethane, a polyolefin, or a polyamide.

Item 15.

A foamable PVC plastisol composition, comprising a PVC resin, optionally a foaming stabilizer, and the chemical blowing agent according to ITEMS 1 to 12.

Item 16.

The foamable PVC plastisol composition according to ITEM 15, which does not contain azodicarbonamide, benzenesulfonylhydrazide, and/or p-toluenesulfonylhydrazide.

Item 17.

A process for manufacturing a polymer, comprising heating the foamable polymer composition according to ITEMS 13 or 14 which comprises the functionalized particulate bicarbonate at a temperature suitable for liberating CO2 gas and melting the polymer during a gelation time at a temperature above glass transition temperature Tg and/or above melting temperature Tm of the polymer which is less than 90 seconds.

Item 18.

A polymer obtained by the process of ITEM 17, wherein the polymer is a PVC, a polyurethane, a polyolefin, or a polyamide.

Item 19.

A process for manufacturing a polymer, comprising heating the foamable PVC plastisol composition according to ITEMS 15 or 16 which comprises the functionalized particulate bicarbonate at a temperature suitable for liberating CO2 gas and melting the PVC resin during a gelation time, wherein said gelation time with the chemical blowing agent comprising the functionalized particulate is less than the gelation time that would be obtained with a chemical blowing agent liberating N2, all other components in the foamable PVC plastisol composition being the same.

Item 20.

A foamed PVC obtained by the process of ITEM 19.

Item 21.

A chemical blowing agent for foaming a thermoplastic polymer precursor, for example PVC plastisol or a polymer resin in an extrusion process,
  said chemical blowing agent comprising a functionalized particulate bicarbonate,
  wherein said functionalized particulate bicarbonate contains at least one additive, and
  wherein said additive in the functionalized particulate bicarbonate is at least one following compound:
    one or more polymers;
    one or more amino acids, any derivative thereof, and salts thereof;
    one or more inorganic salts;
    one or more oils;
    one or more fats;
    one or more resin acids, any derivative thereof, and salts thereof;
    one or more fatty acids, any derivative thereof, and salts thereof;
    a carboxylic or polycarboxylic acid, derivative thereof (such as esters), or salts thereof;

one or more soaps;
one or more waxes; or
any combinations thereof.

Item 22.

The chemical blowing agent according to ITEM 21, wherein the blowing agent does not contain any further blowing agent which is an exothermic blowing agent.

Item 23.

The chemical blowing agent according to ITEM 21 or 22, wherein the chemical blowing agent does not contain a compound which liberates nitrogen gas during heating.

Item 24.

The chemical blowing agent according to any of ITEMS 21 to 23, wherein the chemical blowing agent does not contain a compound which liberates ammonia gas during heating.

Item 25.

The chemical blowing agent according to any of ITEMS 21 to 24, wherein the additive in the functionalized particulate bicarbonate is at least one compound selected from the group consisting of an amino acid, derivative thereof, or salt thereof, preferably at least one compound selected from the group consisting of casein, gelatin, glycine, proline, hydroxyproline, glutamic acid, alanine, arginine, aspartic acid, lysine, pectin, serine, leucine, valine, phenylalanine, threonine, isoleucine, hydroxylysine, methionine, histidine, tyrosine and combinations thereof, more preferably leucine.

Item 26.

The chemical blowing agent according to any of ITEMS 21 to 24, wherein the additive in the functionalized particulate bicarbonate is at least one compound selected from the group consisting of a fatty acid, derivative thereof (such as ester), or salt thereof, preferably at least one compound selected from the group consisting of lauric acid, stearic acid, glycerol mono stearate and combinations thereof, more preferably lauric acid.

Item 27.

The chemical blowing agent according to any of ITEMS 21 to 24, wherein the additive in the functionalized particulate bicarbonate is at least one polymer selected from the group consisting of polyoxyalkylenes and derivatives thereof including polyethylene glycols, poly(meth)acrylates and derivatives thereof, polyvinylalcohol, polysaccharides and combinations thereof, preferably polymer selected from the group consisting of polyvinylalcohol and polyoxyalkylenes and derivatives thereof including polyethylene glycols.

Item 28.

The chemical blowing agent according to ITEM 27, wherein the polysaccharides are selected from the group consisting of modified, in particular hydrolyzed starch, maltodextrin, arabic gum and combinations thereof, more preferably maltodextrin.

Item 29.

The chemical blowing agent according to any of ITEMS 21 to 24, wherein the additive in the functionalized particulate bicarbonate is at least one resin acid, any derivative thereof, and salts thereof, more preferably rosin acid.

Item 30.

The chemical blowing agent according to any of ITEMS 21 to 24, wherein the additive in the functionalized particulate bicarbonate is at least one oil, preferably a vegetable oil or any derivative thereof, more preferably epoxidized soy bean oil.

Item 31.

The chemical blowing agent according to any of ITEMS 21 to 24, wherein the additive in the functionalized particulate bicarbonate is at least one wax selected from the group consisting of beeswax, carnauba wax and combinations thereof.

Item 32.

The chemical blowing agent according to any of ITEMS 21 to 31, wherein the functionalized particulate bicarbonate comprises sodium bicarbonate.

Item 33.

The chemical blowing agent according to any of ITEMS 21 to 32, wherein the functionalized particulate bicarbonate comprises at least 50% by weight and less than 100% by weight of the bicarbonate component, and from 50% or less to 0.02% by weight of at least one of said additive.

Item 34.

The chemical blowing agent according to any of ITEMS 21 to 33, wherein the functionalized particulate bicarbonate comprises at least 65% by weight and less than 100% by weight of the bicarbonate component, and from 35% or less to 0.02% by weight of at least one of said additive.

Item 35.

The chemical blowing agent according to any of ITEMS 21 to 34, wherein the particles of the functionalized particulate bicarbonate have a particle size distribution of $D_{50}$ of more than 1 µm and at most 250 µm, preferably at most 100 µm, more preferably at most 60 µm, yet more preferably at most 40 µm, yet most preferably at most 25 µm.

Item 36.

The chemical blowing agent according to any of ITEMS 21 to 34, wherein the particles of the functionalized particulate bicarbonate have a particle size distribution of $D_{50}$ of at most 1 µm.

Item 37.

The chemical blowing agent according to any of ITEMS 21 to 36, wherein the functionalized particulate bicarbonate is obtained by at least one of the following processes:
  by spray-drying (also known as atomization), wherein the additive is dissolved in the bicarbonate-containing solution.
  by grinding or co-grinding (also known as milling or co-milling) with the additive(s) in emulsion or powder form;
  by spray coating and granulation within a fluidized bed,
  by spray agglomeration within a fluidized bed,
  by spray chilling (e.g., spray cooling, spray freezing),
  by roller compaction, and/or
  by extrusion, including simultaneous mixing/extrusion.

Item 38.

The chemical blowing agent according to ITEM 37, wherein the functionalized particulate bicarbonate is obtained by at least one said process and is further subjected to milling to reduce its mean particle size.

Item 39.

The chemical blowing agent according to any of ITEMS 21 to 38, further comprising an second compound which liberates CO2 upon heating, said second compound being selected from the group consisting of a carboxylic or polycarboxylic acid, derivative thereof (such as esters), or salts thereof.

Item 40.

The chemical blowing agent according to ITEM 39, wherein said second compound is functionalized with at least one additive which is different or the same as the one in the functionalized particulate bicarbonate, preferably the same additive.

Item 41.

The chemical blowing agent according to ITEM 39 or 40, wherein said second compound is at least one of:

fumaric acid, tartaric acid, citric acid, citrates (such as sodium hydrogen citrate, disodium citrate), or esters of citric acid; or combination thereof.

Item 42.

A foamable polymer composition, comprising a polymer, optionally a foaming stabilizer, and the chemical blowing agent according to any of ITEMS 21 to 41.

Item 43.

The foamable polymer composition according to ITEM 42, wherein the polymer is a PVC, a polyurethane, a polyolefin, or a polyamide.

Item 44.

A foamable PVC plastisol composition, comprising a PVC resin, optionally a foaming stabilizer, and the chemical blowing agent according to any of ITEMS 21 to 41.

Item 45.

The foamable PVC plastisol composition according to ITEM 44, which does not contain azodicarbonamide, benzenesulfonylhydrazide, and/or p-toluenesulfonylhydrazide.

Item 46.

A process for manufacturing a polymer, comprising heating the foamable polymer composition according to ITEMS 42 or 43 which comprises the functionalized particulate bicarbonate at a temperature suitable for liberating CO2 gas and melting the polymer during a gelation time at a temperature above glass transition temperature Tg and/or above melting temperature Tm of the polymer which is less than 130 seconds.

Item 47.

A foamed polymer obtained by the process of ITEM 46, wherein the polymer is a PVC, a polyurethane, a polyolefin, or a polyamide.

Item 48.

A process for manufacturing a PVC polymer, comprising heating the foamable PVC polymer composition according to ITEMS 44 or 45 which comprises the functionalized particulate bicarbonate and the PVC resin at a temperature suitable for liberating CO2 gas and melting the PVC polymer during a gelation time from 90 seconds to 120 seconds at a temperature from 190 to 210° C., preferably from 200 to 210° C., to provide a foamed PVC polymer.

Item 49.

The process according to ITEM 48, wherein the foamable polymer composition is spread coated on a surface before heating and melting, and wherein the foamed polymer has an expansion ratio of at least 270, preferably at least 280, more preferably at least 300 and/or has a density of less than 0.6 g/cm$^3$, preferably less than 0.55 g/cm$^3$, more preferably at most 0.5 g/cm$^3$.

Item 50.

A process for manufacturing a polymer, comprising heating the foamable PVC plastisol composition according to ITEMS 44 or 45 which comprises the functionalized particulate bicarbonate at a temperature suitable for liberating CO2 gas and melting the PVC resin during a gelation time, wherein said gelation time with the chemical blowing agent comprising the functionalized particulate is less than the gelation time that would be obtained with a chemical blowing agent liberating N2, all other components in the foamable PVC plastisol composition being the same.

Item 51.

A foamed PVC obtained by the process of any of ITEMS 48, 49 or 50.

The following examples are given by way of non-limiting illustration of the present invention, and variations thereof that are readily accessible to a person skilled in the art.

EXAMPLES

Co-Milling

Milling was performed continuously in an UltraRotor III instrument from Jäckering, equipped with a classifier. Sodium Bicarbonate particles were loaded at the bottom of the mill from 10 to 300 kg/h under air injection at room temperature. The functionalization additive was added at the mid level of the mill in order to reach the desired weight content of functionalization additive in the mix. Mill rotary speed and classifier rotary speed were selected to reach the desired particle size distribution.

Extrusion-Mixing

The extrusion-mixing process was performed continuously in a UCP25 instrument from HASLER Group which had an inlet point and paddles. Sodium Bicarbonate particles were loaded at the UCP25 inlet point from 1 to 2 kg/h. The functionalization additive was loaded a few centimeters after the main inlet point, from 0.1 to 1 kg/h. Rotary speed of the paddles was 50 rpm. Instrument temperature was kept at room temperature.

Milling after Extrusion-Mixing

The functionalized sodium bicarbonate product exiting the extrusion-mixing process was continuously injected at the top of a UPZ100 mill from Hosokawa Alpine at a loading rate of from 0.5 to 10 kg/h. The mill has a rotor speed selected between 10,000 and 17,000 rpm and the mill was operated at room temperature.

Agglomeration (⇒FB Agglomeration+Milling)

Product out of fluid bed agglomeration process was injected at the top of a UPZ100 mill from Hosokawa Alpine. Formulated sodium Bicarbonate was loaded from 0.5 to 10 kg/h and the mill rotor speed was selected between 10.000 and 17.000 rpm. Process temperature was the room temperature.

Fluid Bed Spray Coating (⇒FB Coating+Milling)

Spray coating was performed in a batch fluidized bed WFP-mini instrument from DMR Prozesstechnologie which comprised a fluidization chamber, means to load particles, means to inject the functionalization additive generally in liquid form, and means to inject a fluidization gas at the bottom of that chamber. Sodium Bicarbonate particles were initially loaded from 100 g to 1 kg in the fluidization chamber. Fluidization air was heated from 10 to 100° C., and its flowrate was between 10 and 40 m$^3$/h. A liquid containing the functionalization additive was sprayed from the chamber bottom at a temperature between 20 and 90° C. The liquid was generally a solution of the functionalization additive in a solvent, preferably an aqueous solution with a concentration between 1 and 80 wt %. The liquid was sprayed under a flowrate of up to 20 g/min in order to evaporate the solvent (e.g., water) and coat the functionalization additive (generally by way of crystallization) onto the sodium bicarbonate particles. The content of the coated functionalization additive was between 1 and 70 wt %.

The product obtained after spray coating was generally milled. The spray coated particles that exited the fluid bed coating process were injected at the top of a UPZ100 mill from Hosokawa Alpine at a loading rate of from 0.5 to 10 kg/h and the mill had a rotor speed selected between 10,000 and 17,000 rpm and was operated at room temperature.

Preparation of PVC Plastisol

A method for making a PVC plastisol may generally follow the following steps:
- the weight of the PVC resin is measured in a 2-liter stainless steel pot and the rest of the formula is weighed apart;
- The stainless steel pot is placed under a hydraulic mixer (Pendraulik) with a deflocculating shear blade (rotor blade diameter 70 mm)
- Stirring at 250 rev/min during addition of the mineral filler, plasticizer and blowing agent
- Stirring at 4200 rev/min for 45 seconds, once the powders are suspended (temperature about 40-50° C., if time higher agitation, T may rise to 60-70° C.)
- Vacuum preparation to strip air bubbles. When the level of preparation goes up into the beaker, the beaker may be tapped on the bench to remove bubbles faster.
- When the level of preparation is stable in the presence of the vacuum, count 5 minutes before cutting vacuum and then end air stripping.
- To avoid foaming, optionally adding a foam stabilizer (such as from BYK provider)
- temperature setting in a Werner Mathis oven at a preset temperature, usually T=190, 200 or 210° C.
- A paper (silicone paper in examples 1-12 and regular paper (from Claire Fontaine) in examples 13-51) is installed and heated for 10 seconds to remove residual water from the paper
- Plastisol mixture is spread on the paper in a thickness of 750 microns
- The PVC plastisol is heated up to 2 minutes for gelation (usually 60s, 90s, 120s),
- Wait until the plastisol is cooled for remove it from the paper.

The following chemicals were used in the examples:

| SolVin ® 367 NF | PVC resin | of Inovyn |
|---|---|---|
| SolVin ® 266 SC | PVC resin | of Inovyn |
| Durcal ® 15 | CaCO$_3$ | of Omya |
| Palatinol ® | (DINP) di-isononyl phthalate (C$_{26}$H$_{42}$O$_4$) | of BASF |
| Disperplast 1150 | | of BYK |
| Viscobyk ® 4040 | | of BYK |
| BYK 3155 | | of BYK |
| BYK 8070 | | of BYK |
| Genitron ® SCE | (70% azodicarbonamide + 30% kicker) | of Lanxess |
| MB10 | feet fusing mono ester of benzoic acid and isodecyl alcohol | of ExxonMobil |
| Beeswax | | of Dousselin |
| Carnauba wax | | of Dousselin |
| Bergabest GS SE | Glycerol mono stearate (GMS) | of Berg & Schmidt |

-continued

| Eudragit ® RL 30D | poly(meth)acrylate | of Evonik |
|---|---|---|
| HSE Drapex ® 39 and 392 | epoxidized soy bean oil | by Galata Chemicals |
| PEG400 | | of Sigma Aldrich |
| PFG4000 | | of INEOS Oxide |
| Poval ® | Polyvinylalcohol | of Kuvary |
| Palmac ® 99-12 | lauric acid | of Berg & Schmidt |
| Rosin acid | | of Moulage Form Composite |
| HiCap ® 100 | starch | of Ingredion |
| Stearic acid | | of FACI |

Example 1 (not in Accordance with Invention)

Examples 2-4

Additive=Leucine (in Accordance with Invention)

A functionalized sodium bicarbonate was prepared by spray-drying sodium bicarbonate with 1000 ppm leucine (as an amino acid additive).

For Examples 2-4, PVC Plastisol compositions were prepared by using the functionalized sodium bicarbonate in powder form as the blowing agent. The functionalized sodium bicarbonate in powder form was mixed in the presence at least one plasticizer, at least one polyvinyl chloride polymer, and optionally one or more polymer additives such an inorganic filler.

The PVC Plastisol composition of Example 1 was prepared by using azodicarbonamide as the blowing agent. The other components of the plastisol of Example 1 were the same as those used in Examples 2-4.

The specific components and amounts as mentioned in Table 1 were chosen.

In each example, the components were dispersed on a high speed mixer and them mixed and de-aerated under vacuum.

The resulting liquid PVC pastes (plastisols) of Examples 1 to 4 were in each case spread coated at a thickness of about 0.75 mm on silicone paper and heated in a Thermosol Werner Mathis oven set at 185° C. for 120 seconds for Example 1 (control) or from 60, 80, 120 seconds for Examples 2 to 4 (invention), respectively.

The surface and structure of the foam was assessed visually. The expansion rate was the ratio of the difference between the final thickness of the foamed product after Werner Mathis oven heating and the initial thickness of the spread coated layer (here about 0.75 mm) before it passed the Werner Mathis oven heating, over the initial thickness. The expansion ratio was calculated as the ratio of the final thickness of the foamed product over the initial thickness of the spread coated layer (here about 0.75 mm). The results are provided in TABLE 1, where "PCR" means parts by weight of PVC resin.

TABLE 1

| | | Examples | | | |
|---|---|---|---|---|---|
| | | 1<br>PLASTISOL<br>BASE AZO<br>PCR | 2<br>Spray-dried Bicar +<br>1000 ppm leucine<br>PCR | 3<br>Spray-dried Bicar +<br>1000 ppm leucine<br>PCR | 4<br>Spray-dried Bicar +<br>1000 ppm leucine<br>PCR |
| PVC resin | SolVin 367 NF | 89.9 | 89.9 | 89.9 | 89.9 |
| | SolVin 266 SC | 10.1 | 10.1 | 10.1 | 10.1 |
| Inorganic filler | Durcal 15 (CaCO$_3$) | 80.1 | 80.1 | 80.1 | 80.1 |
| Plastisizer | Foam stabilizer (DINP) | 58.1 | 24.2 | 24.2 | 24.2 |
| Wetting and dispersing agent of TiO$_2$ and ZnO | Disperplast 1150 | 0.3 | 0.3 | 0.3 | 0.3 |
| Viscosity Modifiers | Viscobyk 4040 | 3.2 | 3.2 | 3.2 | 3.2 |
| Prevent the foam release agent | BYK 3155 | 0.3 | 0.3 | 0.3 | 0.3 |
| Foam stabilizer | BYK 8070 | — | 3.0 | 3.0 | 3.0 |
| | TiO2 | 2.3 | 2.3 | 2.3 | 2.3 |
| Blowing agent | Azodicarbonamide | 2.2 | — | — | — |
| Blowing agent | Sodium bicarbonate[1] | — | 6.6 | 6.6 | 6.6 |
| | ZnO | 1 | | | |
| Conditions/Results | Pre-gelification phase | 30 sec at 90° C. | 30 sec at 90° C. | 30 sec at 90° C. | 30 sec at 90° C. |
| | Gelification phase | 2 min at 185° C. | 60 sec at 185° C. | 80 sec at 185° C. | 120 sec at 185° C. |
| | Coating appearance | Very smooth | Smooth | Slightly granular | Slightly granular |
| | Thickness (in mm) | 2.4 | 2.18 | 1.43 | 1.05 |
| | Expansion rate (%) | 220 | 191 | 91 | 40 |
| | Expansion ratio (%) | 320 | 290 | 190 | 140 |

[1]Spray-dried sodium bicarbonate, 1000 ppm Leucine d$_{10}$ = 5 µm d$_{50}$ = 19 µm d$_{90}$ = 34 µm Examples 5-8 (not in Accordance with Invention)

For Examples 6-8, PVC Plastisol compositions were prepared by using a non-functionalized sodium bicarbonate in powder form as the blowing agent. The non-functionalized sodium bicarbonate in powder form was mixed in the presence at least one plasticizer, at least one polyvinyl chloride polymer, and optionally one or more polymer additives such an inorganic filler. A PVC Plastisol composition of Example 5 was prepared by using azodicarbonamide as the blowing agent. The other components of the plastisol of Example 5 were the same as those used in Examples 6-8. The specific components and amounts as mentioned in TABLE 2 were chosen. "PCR" in TABLE 2 means parts by weight of resin. In each example 5-8, the components were dispersed on a high speed mixer and them mixed and de-aerated under vacuum.

The resulting liquid PVC pastes (plastisols) of Examples 5-8 were in each case spread coated at a thickness of about 0.75 mm on silicone paper and heated in a Thermosol Werner Mathis oven set with a gelation period at 185° C. for 120 seconds.

Examples 6 to 8 with non-functionalized bicarbonates as foaming agent gave poor expansion results compared to the Example 5 using azodicarbonamide as the blowing agent. After gelling, PVC plastisols surfaces of Examples 6 to 8 had a very granular appearance which was a sign of surface coalescence of gas bubbles in the polymer melt.

TABLE 2

| | | Examples | | | |
|---|---|---|---|---|---|
| | | 5<br>A<br>PLASTISOL<br>BASE AZO<br>PCR | 6<br>B<br>Bicar 0/6P<br>PCR | 7<br>C<br>Bica 0/50<br>PCR | 8<br>D<br>Bicar 0/50<br>PCR |
| PVC resin | PVC resin | 100 | 100 | 100 | 100 |
| Inorganic filler | CaCO$_3$ | 40 | 40 | 40 | 40 |
| Plasticizer | Palatinol N (DINP) | 65 | 65 | 65 | 65 |
| | MB10 | | | | 20 |
| Blowing Agent | Azodicarbonamide + Kicker[d] | 4.5 | 1.1 | 1.1 | 1.1 |
| | Bicar 0/50 crushed[1] | X | | | 8 | 8 |
| | Bicar 0/6P[2] | X | 6 | | |
| Result | Coating appearance | Very smooth | Very granular | Very granular | Very granular |

[1]Bicar 06/P trade product of Solvay
[2]Bicar 0/50 crushed in Alpine 01 - d$_{10}$ = 3.4 µm d$_{50}$ = 17.8 µm d$_{90}$ = 39.6 µm Example 9 (not in Accordance with Invention)

Examples 10-12 (in Accordance with Invention)

Functionalization Additive=Stearic Acid

A functionalized sodium bicarbonate was prepared by co-grinding sodium bicarbonate with 2 wt % stearic acid (as a fatty acid additive).

For Examples 10-12, PVC Plastisol compositions were prepared by using the functionalized sodium bicarbonate in powder form as the blowing agent. The functionalized sodium bicarbonate in powder form was mixed in the presence at least one plasticizer, at least one polyvinyl chloride polymer, and optionally one or more polymer additives such an inorganic filler. The PVC Plastisol composition of Example 9 was prepared by using azodicarbonamide as the blowing agent. The other components of the plastisol of Example 9 were the same as those used in Examples 10-12. The specific components and amounts as mentioned in Table 3 are chosen.

In each example, the components were dispersed on a high speed mixer and them mixed and de-aerated under vacuum.

The resulting liquid PVC pastes (plastisols) of Examples 9 to 12 were in each case spread coated at a thickness of about 0.75 mm on silicone paper and heated in a Thermosol Werner Mathis oven set at 185° C. for 120 seconds for Example 9 (control) or from 60, 80, 120 seconds for Examples 10 to 12 (invention), respectively.

The surface and structure of the foam was assessed visually. The expansion rate was the ratio of the difference between the final thickness of the foamed product after Werner Mathis oven heating and the initial thickness of the spread coated layer (here about 0.75 mm) before it passed the Werner Mathis oven heating, over the initial thickness. The expansion ratio was calculated as the ratio of the final thickness of the foamed product over the initial thickness of the spread coated layer (here about 0.75 mm). The results are provided in TABLE 3, where "pcr" means parts by weight of PVC resin.

TABLE 3

| | | Examples | | | |
|---|---|---|---|---|---|
| | | 9 Test 1 | 10 A | 11 B | 12 C |
| | TEST | PLASTISOL BASE AZO PCR | Cogrinding Bicar + 2% stearic acid PCR | Cogrinding Bicar + 2% stearic acid PCR | Cogrinding Bicar + 2% stearic acid PCR |
| PVC resin | SolVin 367 NF | 89.9 | 89.9 | 89.9 | 89.9 |
| | SolVin 266 SC | 10.1 | 10.1 | 10.1 | 10.1 |
| Inorganic filler | Durcal 15 ($CaCO_3$) | 80.1 | 80.1 | 80.1 | 80.1 |
| Plastisizer | Foam stabilizer (DINP) | 58.1 | 24.2 | 24.2 | 24.2 |
| Wetting and dispersing agent of $TiO_2$ and ZnO | Disperplast 1150 | 0.3 | 0.3 | 0.3 | 0.3 |
| Viscosity Modifiers | Viscobyk 4040 | 3.2 | 3.2 | 3.2 | 3.2 |
| Prevent the foam release agent | BYK 3155 | 0.3 | 0.3 | 0.3 | 0.3 |
| Foam stabilizer | BYK 8070 | — | 3.0 | 3.0 | 3.0 |
| | TiO2 | 2.3 | 2.3 | 2.3 | 2.3 |
| Blowing agent | Azodicarbonamide | 2.2 | — | — | — |
| Blowing agent | Sodium bicarbonate[1] | — | 6.6 | 6.6 | 6.6 |
| | ZnO | 1 | — | — | — |
| Conditions/Results | Pre-gelification phase | 30 sec at 90° C. | 30 sec at 90° C. | 30 sec at 90° C. | 30 sec at 90° C. |
| | Gelification phase | 2 min at 185° C. | 60 sec at 185° C. | 80 sec at 185° C. | 120 sec at 185° C. |
| | Coating appearance | Very smooth | Smooth | Slightly granular | Granular |
| | Thickness (in mm) | 2.4 | 2.05 | 1.31 | 0.92 |
| | Expansion rate (%) | 220 | 185 | 84 | 36 |
| | Expansion ratio (%) | 320 | 270 | 175 | 120 |

[1]Cogrinding Bicar + 2% stearic acid coating: $d_{10}$ = 2.8 µm $d_{50}$ = 17.1 µm $d_{90}$ = 50.3 µm When tested at lower gelation times (1 min at 190° C.), the results obtained in the presence of sodium bicarbonate are comparable to those obtained with formulation with azodicarbonamide in terms:

of obtained visual appearance of the coating surface and of the polymer expansion rate.

The tests carried out to gelation times higher than 1 min (80 sec and 120 sec) show surfaces having a granular surface appearance from the plastisols based on functionalized bicarbonate, meaning that gas bubble coalescence occurs in the cellular structure.

Example 13 (not in Accordance with Invention)

Blowing Agent=Azodicarbonamide

The PVC Plastisol compositions of Example 13 were prepared in a Dispermat apparatus by using azodicarbonamide as the blowing agent. The azodicarbonamide product used was Genitron SCE (Lanxess) which consisted of 75 wt % azodicarbonamide and 25 wt % kicker (zinc oxide/zinc stearate). The components of the plastisol were dispersed on a high speed mixer and then mixed and de-aerated under vacuum. The resulting liquid PVC pastes (plastisols) of Example 13 are in each case spread coated at a thickness of about 0.75 mm on a piece of paper (Claire Fontaine) and heated in a Thermosol Werner Mathis oven set at 200 or 210° C. for 90 or 120 seconds.

The expansion rate was the ratio of the difference between the final thickness of the foamed product after Werner Mathis oven heating and the initial thickness of the spread coated layer (here about 0.75 mm) before it passed the Werner Mathis oven heating, over the initial thickness. The expansion ratio was calculated as the ratio of the final thickness of the foamed product over the initial thickness of the spread coated layer (here about 0.75 mm). The specific components and amounts in each plastisol, the oven temperature, the time for gelation, the thickness of the foamed product after oven heating, the expansion rate, the expansion ratio, and the density of the PVC foams are provided in TABLE 4 where "pcr" means parts by weight of PVC resin.

TABLE 4

| | Azodicarbonamide as blowing agent | | | | | | |
|---|---|---|---|---|---|---|---|
| | | Example 13 | | | | | |
| | Type of blowing agent | Azodicarbonamide | | | | | |
| | Plastisol Ex. | 13 p1 | 13 p2 | 13 p3 | 13 p4 | 13 p5 | 13 p6 |
| PVC resin | 367 NF | 100 | 100 | 100 | 100 | 100 | 100 |
| Filler | CaCO$_3$ | 120 | 120 | 120 | 120 | 120 | 120 |
| Plastisizer | Palatinol N | 80 | 80 | 80 | 80 | 80 | 80 |
| Defoamer | BYK3155 | — | 3 | — | 3 | — | 3 |
| Blowing agent | Genitron SCE (incl .25% zinc oxide/stearate) | 4 | 4 | 4 | 4 | 4 | 4 |
| | Gelation temp (° C.) | 200 | 200 | 210 | 210 | 210 | 210 |
| | Gelation Time (sec.) | 120 | 120 | 120 | 120 | 90 | 90 |
| | Thickness (mm) | 3.16 | 3.06 | 3.33 | 3.42 | 2.58 | 2.80 |
| | Expansion rate (%) | 320 | 310 | 340 | 360 | 240 | 270 |
| | Expansion ratio (%) | 420 | 410 | 440 | 460 | 340 | 370 |
| | Density (g/cm$^3$) | 0.37 | 0.36 | 0.32 | 0.34 | 0.43 | 0.39 |

Example 14 (in Accordance with Invention)

With Functionalization Additive=Beeswax

One sample of functionalized sodium bicarbonate was prepared by spray coating sodium bicarbonate particles in a fluidized bed with beeswax and then milling. The functionalized sodium bicarbonate sample is identified as Example 14A (20 wt % beeswax).

For Example 14, PVC Plastisol compositions were prepared in a Dispermat apparatus. In each example, the components of the plastisols were dispersed on a high speed mixer and then mixed and de-aerated under vacuum. The resulting liquid PVC pastes (plastisols) of Example 14 are in each case spread coated at a thickness of about 0.75 mm on a piece of paper (Claire Fontaine) and heated in a Thermosol Werner Mathis oven set at 200 or 210° C. for 90 or 120 seconds. The expansion ratio is calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio, and the density of the PVC foams are provided in TABLE 5, where "per" means parts by weight of PVC resin.

TABLE 5

| | Functionalization Additive = Beeswax | | | | |
|---|---|---|---|---|---|
| | | Example 14 | | | |
| | Functionalized Bicarbonate as blowing agent | Ex. 14A | | | |
| | Funct. Method | Spray Coating with fluidized bed/milling | | | |
| | Funct. Additive | 20 wt % Beeswax | | | |
| | D10/D50/D90 (μm) | 4.4/21/65 | | | |
| | Plastisol Ex. | 14 p1 | 14 p2 | 14 p3 | 14p4 |
| PVC resin | 367 NF (pcr) | 100 | 100 | 100 | 100 |
| Filler | CaCO$_3$ (pcr) | 120 | 120 | 120 | 120 |
| Plastisizer | Palatinol N (pcr) | 80 | 80 | 80 | 80 |

TABLE 5-continued

| | Functionalization Additive = Beeswax | | | | |
|---|---|---|---|---|---|
| | | Example 14 | | | |
| Defoamer | BYK3155 (pcr) | 3 | 3 | 3 | 3 |
| Blowing agent | Func. Bicar. (pcr) | 8 | 8 | 8 | 8 |
| | Gelation temp (° C.) | 200 | 200 | 210 | 210 |
| | Gelation Time (sec.) | 90 | 120 | 90 | 120 |
| | Thickness (mm) | 2.11 | 2.12 | 2.66 | 2.10 |
| | Expansion ratio (%) | 280 | 280 | 350 | 280 |
| | Density (g/cm$^3$) | 0.53 | 0.51 | 0.42 | 0.51 |

Example 15 (in Accordance with Invention)

Functionalization Additive=Carnauba Wax

One sample of functionalized sodium bicarbonate was prepared by extrusion of sodium bicarbonate particles with carnauba wax, and then milling. The functionalized sodium bicarbonate sample is identified as Example 15A (10 wt % carnauba wax).

For Example 15, the same method of preparation of the PVC Plastisol compositions and preparation of PVC foams were used as described for Example 14. The expansion ratio calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 6, where "pcr" means parts by weight of PVC resin.

TABLE 6

Functionalization Additive = Carnauba wax

|  |  | Example 15 |  |  |
|---|---|---|---|---|
|  | Functionalized Bicarbonate | Ex. 15A | | |
|  | Funct. Method | Extrusion/milling | | |
|  | Funct. Additive | 10 wt % carnauba wax | | |
|  | D10/D50/D90 (μm) | 10/57/125 | | |
|  | Plastisol Ex. | 15 p1 | 15 p2 | 15 p3 |
| PVC resin | 367 NF (pcr) | 100 | 100 | 100 |
| Filler | CaCO₃ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
|  | Gelation temp (° C.) | 200 | 210 | 210 |
|  | Gelation Time (sec.) | 120 | 90 | 120 |
|  | Thickness (mm) | 2.55 | 2.50 | 3.07 |
|  | Expansion ratio (%) | 340 | 330 | 410 |
|  | Density (g/cm³) | 0.4 | 0.42 | 0.37 |

Example 16-17 (in Accordance with Invention)

Functionalization Additive=Glycerol Monostearate

One sample of functionalized sodium bicarbonate was prepared by extrusion of sodium bicarbonate particles with glycerol monostearate (GMS) as the functionalization additive, and then milling. Another sample of functionalized sodium bicarbonate was prepared by spray agglomeration of sodium bicarbonate particles with GMS, and then milling. The functionalized sodium bicarbonate samples are identified as Example 16A (spray agglomerated with 25 wt % GMS) and Example 17A (extruded with 10 wt % GMS)

For Examples 16-17, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 7, where "pcr" means parts by weight of PVC resin.

TABLE 7

FunctionalizationAdditive = glycerol monostearate

|  |  | Example 16 |  |  |  |  |  |
|---|---|---|---|---|---|---|---|
|  | Functionalized Bicarbonate | Ex. 16A | | | | | |
|  | Funct. Method | Spray Agglomeration/milling | | | | | |
|  | Funct. additive | 25 wt % glycerol monostearate | | | | | |
|  | D10/D50/D90 (μm) | 7.8/29/162 | | | | | |
|  | Plastisol Ex. | 16 p1 | 16 p2 | 16 p3 | 16 p4 | 16 p5 | 16 p6 |
| PVC resin | 367 NF (pcr) | 100 | 100 | 100 | 100 | 100 | 100 |
| Filler | CaCO₃ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | — | — | — | 3 | 3 | 3 |
| Blowing agent | Func. Bicar. (pcr) | 8 | 8 | 8 | 8 | 8 | 8 |
|  | Gelation temp (° C.) | 200 | 210 | 210 | 200 | 210 | 210 |
|  | Gelation Time (sec.) | 90 | 90 | 120 | 90 | 90 | 120 |
|  | Thickness (mm) | 2.23 | 2.31 | 2.03 | 2.47 | 2.49 | 2.54 |
|  | Expansion ratio (%) | 300 | 310 | 270 | 330 | 330 | 340 |
|  | Density (g/cm³) | 0.52 | 0.49 | 0.58 | 0.46 | 0.44 | 0.42 |

TABLE 7-continued

| | FunctionalizationAdditive = glycerol monostearate | | | |
|---|---|---|---|---|
| | | Example 17 | | |
| | Functionalized Bicarbonate | Ex. 17A | | |
| | Funct. Method | Extrusion/milling | | |
| | Funct. additive | 10 wt % GMS | | |
| | D10/D50/D90 (μm) | 10/41/97 | | |
| | Plastisol Ex. | 17 p1 | 17 p2 | 17 p3 |
| PVC resin | 367 NF (pcr) | 100 | 100 | 100 |
| Filler | CaCO₃ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
| | Gelation temp (° C.) | 200 | 210 | 210 |
| | Gelation Time (sec.) | 120 | 90 | 120 |
| | Thickness (mm) | 2.57 | 2.78 | 2.45 |
| | Expansion ratio (%) | 340 | 370 | 330 |
| | Density (g/cm³) | 0.43 | 0.39 | 0.44 |

Example 18 (in Accordance with Invention)

Functionalization Additive=Eudragit RL 30D (Poly(Meth)Acrylate)

One sample of functionalized sodium bicarbonate was prepared by extrusion of sodium bicarbonate particles with a poly(meth)acrylate under the brandname of Eudragit® RL 30D available from Evonik which represents a polymer as functionalization additive, and then milling. The functionalized sodium bicarbonate sample is identified as Example 18A (4 wt % Eudragit® RL 30D).

For Example 18, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 8, where "pcr" means parts by weight of PVC resin.

TABLE 8

| | Functionalization Additive = Eudragit ® RL 30D (organic polymer additive) | | | | |
|---|---|---|---|---|---|
| | | Example 18 | | | |
| | Functionalized Bicarbonate | Ex. 18A | | | |
| | Funct. Method | Extrusion/milling | | | |
| | Funct. Additive | 4 wt % Eudragit ® RL 30D | | | |
| | D10/D50/D90 (μm) | 6.9/30/75 | | | |
| | Plastisol Ex. | 18 p1 | 18 p2 | 18 p3 | 18 p4 |
| PVC resin | 367 NF (pcr) | 100 | 100 | 100 | 100 |
| Filler | CaCO₃ (pcr) | 120 | 120 | 120 | 120 |
| Plastisizer | Palatinol N (pcr) | 80 | 80 | 80 | 80 |
| Defoamer | BYK3155 (pcr) | 3 | 3 | 3 | 3 |
| Blowing agent | Func. Bicar. (pcr) | 8 | 8 | 8 | 8 |

TABLE 8-continued

| Functionalization Additive = Eudragit ® RL 30D (organic polymer additive) | | | | |
|---|---|---|---|---|
| | Example 18 | | | |
| Gelation temp (° C.) | 200 | 210 | 210 | 210 |
| Gelation Time (sec.) | 90 | 60 | 90 | 120 |
| Thickness (mm) | 2.41 | 2.56 | 3.24 | 2.53 |
| Expansion ratio (%) | 320 | 340 | 430 | 340 |
| Density (g/cm³) | 0.45 | 0.47 | 0.33 | 0.42 |

Examples 19-20 (in Accordance with Invention)

Functionalization Additive=Epoxidized Soy Bean Oil

Two samples of functionalized sodium bicarbonate were prepared by extrusion of sodium bicarbonate particles with an epoxidized soy bean oil (sold as HSE Drapex 39 and 392 from Galata Chemicals) which represents the functionalization additive, and then milling. The epoxidized soybean oil is a vinyl additive which can be used as heat stabilizer. The functionalized sodium bicarbonate samples are identified as Example 19A (2 wt % HSE Drapex 392) and Example 20A (2 wt % HSE Drapex 39).

For Examples 19-20, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 9, where "per" means parts by weight of PVC resin.

TABLE 9

Functionalization Additive = epoxidized soy bean oil

| | | Example 19 | | | | Example 20 | | |
|---|---|---|---|---|---|---|---|---|
| | Functionalized Bicarbonate | Ex. 19A | | | | Ex. 20A | | |
| | Funct. Method | Extrusion/milling | | | | Extrusion/milling | | |
| | Funct. additive | 2 wt % HSE Drapex 392 | | | | 2 wt % HSE Drapex 39 | | |
| | D10/D50/D90 (μm) | 5.4/25/61 | | | | — | | |
| | Plastisol Ex. | 19 p1 | 19 p2 | 19 p3 | 19 p4 | 20 p1 | 20 p2 | 20 p3 |
| PVC resin | 367 NF (pcr) | 100 | 100 | 100 | 100 | 100 | 100 | 100 |
| Filler | CaCO₃ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | 3 | 3 | 3 | 3 | 3 | 3 | 3 |
| Blowing agent | Func. Bicar. (pcr) | 8 | 8 | 8 | 8 | 8 | 8 | 8 |
| | Gelation temp (° C.) | 200 | 200 | 210 | 210 | 200 | 210 | 210 |
| | Gelation Time (sec.) | 90 | 120 | 90 | 120 | 120 | 90 | 120 |
| | Thickness (mm) | 2.33 | 2.44 | 2.77 | 2.29 | 2.33 | 2.91 | 2.53 |
| | Expansion ratio (%) | 310 | 330 | 370 | 310 | 310 | 390 | 340 |
| | Density (g/cm³) | 0.48 | 0.48 | 0.38 | 0.49 | 0.47 | 0.41 | 0.47 |

Example 21 (in Accordance with Invention)

Functionalization Additive=Arabic Gum

One sample of functionalized sodium bicarbonate was prepared by spray coating sodium bicarbonate particles in a fluidized bed with arabic gum as functionalization additive, and then milling. The functionalized sodium bicarbonate sample is identified as Example 21A (20 wt % arabic gum).

For Example 21, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 10. "pcr" in TABLE 10 means parts by weight of resin.

TABLE 10

Functionalization Additive = arabic gum

| | | Example 21 | | |
|---|---|---|---|---|
| | Functionalized Bicarbonate | Ex. 21A | | |
| | Funct. Method | Spray coating in fluidized bed/milling | | |
| | Funct. additive | 20 wt % Arabic gum | | |
| | D10/D50/D90 (μm) | 6.2/29/93 | | |
| | Plastisol Ex. | 21 p1 | 21 p2 | 21 p3 |
| PVC resin | 367 NF (pcr) | 100 | 100 | 100 |
| Filler | CaCO₃ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
| | Gelation temp (° C.) | 200 | 210 | 210 |
| | Gelation Time (sec.) | 120 | 90 | 120 |
| | Thickness (mm) | 2.73 | 2.49 | 2.52 |
| | Expansion ratio (%) | 360 | 330 | 340 |
| | Density (g/cm³) | 0.42 | 0.45 | 0.43 |

Example 22 (in Accordance with Invention)

Functionalization Additive=Linoleic Acid

One sample of functionalized sodium bicarbonate was prepared by co-milling of sodium bicarbonate particles with linoleic acid as functionalization additive. The functionalized sodium bicarbonate sample is identified as Example 22A (0.8 wt % linoleic acid).

For Example 22, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 11, where "pcr" means parts by weight of PVC resin.

TABLE 11

Functionalization Additive = linoleic acid

| | | Example 22 |
|---|---|---|
| | Functionalized Bicarbonate | Ex. 22A |
| | Funct. Method | Co-milling |

TABLE 11-continued

Functionalization Additive = linoleic acid

Example 22

|  |  | 0.8 wt % linoleic acid |  |  |  |  |
|---|---|---|---|---|---|---|
|  | Funct. additive D10/D50/D90 (μm) | 2.8/12/25 |  |  |  |  |
|  | Plastisol Ex. | 22 p1 | 22 p2 | 22 p3 | 22 p4 | 22 p4 |
| PVC resin | 367 NF (pcr) | 100 | 100 | 100 | 100 | 100 |
| Filler | CaCO$_3$ (pcr) | 120 | 120 | 120 | 120 | 120 |
| Plastisizer | Palatinol N (pcr) | 80 | 80 | 80 | 80 | 80 |

For Examples 23-24, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 12, where "pcr" means parts by weight of resin.

TABLE 12

Functionalization Additive = maltodextrin

|  |  | Example |  |  |  |  |  |
|---|---|---|---|---|---|---|---|
|  |  | 23 |  |  |  | 24 |  |
|  | Functionalized Bicarbonate | Ex. 23A |  |  |  | Ex. 24A |  |
|  | Funct. Method | Spray Coating/milling |  |  |  | Spray Coating/milling |  |
|  | Funct. additive | 20 wt % Maltodextrin |  |  |  | 20 wt % Maltodextrin |  |
|  | D10/D50/D90 (μm) | 4.9/25/82 |  |  |  | 151/249/403 |  |
|  | Plastisol Ex. | 23 p1 | 23 p2 | 23 p3 | 23 p4 | 24 p1 | 24 p2 |
| PVC resin | 367 NF (pcr) | 100 | 100 | 100 | 100 | 100 | 100 |
| Filler | CaCO$_3$ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | — | — | — | 3 | — | 3 |
| Blowing agent | Func. Bicar. (pcr) | 8 | 8 | 8 | 8 | 8 | 8 |
|  | Gelation temp (° C.) | 200 | 210 | 210 | 210 | 210 | 210 |
|  | Gelation Time (sec.) | 120 | 90 | 120 | 120 | 120 | 120 |
|  | Thickness (mm) | 2.17 | 2.43 | 2.24 | 2.42 | 2.14 | 2.03 |
|  | Expansion ratio (%) | 290 | 320 | 300 | 320 | 290 | 270 |
|  | Density (g/cm$^3$) | 0.52 | 0.47 | 0.49 | 0.45 | 0.52 | 0.54 |

TABLE 11-continued

Functionalization Additive = linoleic acid

Example 22

| | | | | | | |
|---|---|---|---|---|---|---|
| Defoamer | BYK3155 (pcr) | — | 3 | 3 | 3 | 3 |
| Blowing agent | Func. Bicar. (pcr) | 8 | 8 | 8 | 8 | 8 |
|  | Gelation temp (° C.) | 210 | 200 | 200 | 210 | 210 |
|  | Gelation Time (sec.) | 90 | 90 | 120 | 90 | 120 |
|  | Thickness (mm) | 2.11 | 2.49 | 2.35 | 2.66 | 2.01 |
|  | Expansion ratio (%) | 280 | 330 | 310 | 350 | 270 |
|  | Density (g/cm$^3$) | 0.57 | 0.44 | 0.49 | 0.40 | 0.57 |

Examples 23-24 (in Accordance with Invention)

Functionalization Additive=Maltodextrin

Two samples of functionalized sodium bicarbonate were prepared by spray coating of sodium bicarbonate particles in a fluidized bed with maltodextrin as the functionalization additive, and then milling. The functionalized sodium bicarbonate samples are identified as Example 23A and Example 24A (20 wt % maltodextrin).

Examples 25-26 (in Accordance with Invention)

Functionalization Additive=Polyethylene Glycol (PEG400)

Two samples of functionalized sodium bicarbonate were prepared by extrusion of sodium bicarbonate particles with a polyethylene glycol of low molecular weight (<1000 g/mol): PEG400 as the functionalization additive. The functionalized sodium bicarbonate samples are identified as Example 25A (20 wt % PEG400) and Example 26A (10 wt % PEG400).

For Examples 25-26, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 13, where "pcr" means parts by weight of PVC resin.

TABLE 13

Functionalization Additive = Polyethylene Glycol (PEG400)

| | | Example 25 | | | | Example 26 | |
|---|---|---|---|---|---|---|---|
| | Functionalized Bicarbonate | Ex. 25A | | | | Ex. 26A | |
| | Funct. Method | extrusion | | | | extrusion | |
| | Funct. additive | 20 wt % PEG400 | | | | 10 wt % PEG400 | |
| | D10/D50/D90 (μm) | — | | | | — | |
| | Plastisol Ex. | 25 p1 | 25 p2 | 25 p3 | 25 p4 | 26 p1 | 26 p2 |
| PVC resin | 367 NF (pcr) | 100 | 100 | 100 | 100 | 100 | 100 |
| Filler | CaCO$_3$ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | — | — | — | — | — | — |
| Blowing agent | Func. Bicar. (pcr) | 10 | 10 | 10 | 10 | 9 | 9 |
| | Gelation temp (° C.) | 200 | 200 | 210 | 210 | 200 | 210 |
| | Gelation Time (sec.) | 90 | 120 | 90 | 120 | 90 | 90 |
| | Thickness (mm) | 2.52 | 2.14 | 2.80 | 2.62 | 2.54 | 2.43 |
| | Expansion ratio (%) | 340 | 290 | 370 | 350 | 340 | 320 |
| | Density (g/cm$^3$) | 0.44 | 0.51 | 0.38 | 0.41 | 0.44 | 0.44 |

Examples 27-31 (in Accordance with Invention)

Functionalization Additive=Polyethylene Glycol (PEG4000)

Three samples of functionalized sodium bicarbonate were prepared by extrusion of sodium bicarbonate particles with a polyethylene glycol of high molecular weight (>1000): PEG 4000, and then milling. Two other sample of functionalized sodium bicarbonate were prepared by spray coating of sodium bicarbonate particles in a fluidized bed with PEG4000, and then milling. The functionalized sodium bicarbonate samples are identified as Example 27A (extruded with 7 wt % PEG4000), Example 28A (extruded with 10 wt % PEG4000), Example 29A (extruded with 3 wt % PEG4000), Example 30A (spray coated with 10 wt % PEG4000), and Example 31A (spray coated with 20 wt % PEG4000).

For Examples 27-31, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 14. "pcr" in TABLE 14 means parts by weight of resin.

TABLE 14

Functionalization Additive = Polyethylene Glycol (PEG4000)

| | | Example 27 | | | | Example 28 | | |
|---|---|---|---|---|---|---|---|---|
| | Functionalized Bicarbonate | Ex. 27A | | | | Ex. 28A | | |
| | Funct. Method | Extrusion/milling | | | | Extrusion/milling | | |
| | Funct. additive | 7 wt % PEG4000 | | | | 10 wt % PEG4000 | | |
| | D10/D50/D90 (μm) | 4.9/22/57 | | | | 6.9/32/81 | | |
| | Plastisol Ex. | 27 p1 | 27 p2 | 27 p3 | 27 p4 | 28 p1 | 28 p2 | 28 p3 |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | 3 | 3 | 3 | 3 | 3 | 3 | 3 |
| Blowing agent | Func. Bicar. (pcr) | 8 | 8 | 8 | 8 | 8 | 8 | 8 |
| | Gelation temp (° C.) | 200 | 200 | 210 | 210 | 200 | 210 | 210 |
| | Gelation Time (sec.) | 90 | 120 | 90 | 120 | 120 | 90 | 120 |

TABLE 14-continued

| Functionalization Additive = Polyethylene Glycol (PEG4000) | | | | | | | |
|---|---|---|---|---|---|---|---|
| Thickness (mm) | 2.16 | 2.29 | 2.97 | 2.39 | 2.46 | 2.89 | 2.19 |
| Expansion ratio (%) | 290 | 310 | 400 | 320 | 330 | 390 | 290 |
| Density (g/cm$^3$) | 0.54 | 0.50 | 0.37 | 0.43 | 0.43 | 0.37 | 0.48 |

| | | Example | | | | | | |
|---|---|---|---|---|---|---|---|---|
| | | 29 | | | 30 | | | |
| | Functionalized Bicarbonate | Ex. 29A | | | Ex. 30A | | | |
| | Funct. Method | Extrusion/milling | | | Spray Coating/milling | | | |
| | Funct. additive | 3 wt % PEG4000 | | | 10 wt % PEG4000 | | | |
| | D10/D50/D90 (μm) | 5.2/25/61 | | | 5.6/26/65 | | | |
| | Plastisol Ex. | 29 p1 | 29 p2 | 29 p3 | 30 p1 | 30 p2 | 30 p3 | 30 p4 |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | 3 | 3 | 3 | 3 | 3 | 3 | 3 |
| Blowing agent | Func. Bicar. (pcr) | 8 | 8 | 8 | 8 | 8 | 8 | 8 |
| | Gelation temp (° C.) | 200 | 210 | 210 | 200 | 200 | 210 | 210 |
| | Gelation Time (sec.) | 120 | 90 | 120 | 90 | 120 | 90 | 120 |
| | Thickness (mm) | 2.70 | 3.07 | 2.44 | 2.06 | 2.38 | 2.98 | 2.33 |
| | Expansion ratio (%) | 360 | 410 | 330 | 270 | 320 | 400 | 310 |
| | Density (g/cm$^3$) | 0.43 | 0.38 | 0.44 | 0.52 | 0.44 | 0.36 | 0.45 |

| | | Example 31 | | | |
|---|---|---|---|---|---|
| | Functionalized Bicarbonate | Ex. 31A | | | |
| | Funct. Method | Spray Coating/milling | | | |
| | Funct. Additive | 20 wt % PEG4000 | | | |
| | D10/D50/D90 (μm) | 6.6/29/75 | | | |
| | Plastisol Ex. | 31 p1 | 31 p2 | 31 p3 | 31 p4 |
| PVC resin | 367 NF (pcr) | 100 | 100 | 100 | 100 |
| Filler | CaCO$_3$ (pcr) | 120 | 120 | 120 | 120 |
| Plastisizer | Palatinol N (pcr) | 80 | 80 | 80 | 80 |
| Defoamer | BYK3155 (pcr) | — | 3 | 3 | 3 |
| Blowing agent | Func. Bicar. (pcr) | 8 | 8 | 8 | 8 |
| | Gelation temp (° C.) | 210 | 200 | 210 | 210 |
| | Gelation Time (sec.) | 90 | 120 | 90 | 120 |
| | Thickness (mm) | 2.04 | 2.46 | 2.66 | 2.30 |
| | Expansion ratio (%) | 270 | 330 | 350 | 310 |
| | Density (g/cm$^3$) | 0.56 | 0.46 | 0.43 | 0.49 |

Examples 32-34 (in Accordance with Invention)

Functionalization Additive=Polyvinylalcohol (PVOH)

Three samples of functionalized sodium bicarbonate were prepared by extrusion of sodium bicarbonate particles with polyvinylalcohol (PVOH), an organic polymer as the functionalization additive, and then milling. The functionalized sodium bicarbonate samples are identified as Example 32A (extruded with 5 wt % PVOH), Example 33A (extruded with 10 wt % PVOH), and Example 34A (extruded with 35 wt % PVOH).

For Examples 32-34, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 15. "pcr" in TABLE 15 means parts by weight of resin.

TABLE 15

Functionalization Additive = polyvinylalcohol (PVOH)

| | | Example | | | | | |
|---|---|---|---|---|---|---|---|
| | | 32 | | 33 | | | |
| | Functionalized Bicarbonate | Ex. 32A | | Ex. 33A | | | |
| | Funct. Method | Extrusion/milling | | Extrusion/milling | | | |
| | Funct. additive | 5 wt % PVOH | | 10 wt % PVOH | | | |
| | D10/D50/D90 (μm) | — | | 4.3/55/173 | | | |
| | Plastisol Ex. | 32 p1 | 32 p2 | 33 p1 | 33 p2 | 33 p3 | 33 p4 |
| PVC resin | 367 NF (pcr) | 100 | 100 | 100 | 100 | 100 | 100 |
| Filler | CaCO$_3$ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | 3 | 3 | 3 | 3 | 3 | 3 |
| Blowing agent | Func. Bicar. (pcr) | 8 | 8 | 8 | 8 | 8 | 8 |
| | Gelation temp (° C.) | 200 | 210 | 200 | 200 | 210 | 210 |
| | Gelation Time (sec.) | 120 | 120 | 90 | 120 | 90 | 120 |
| | Thickness (mm) | 2.04 | 2.61 | 2.06 | 2.51 | 2.57 | 2.49 |
| | Expansion ratio (%) | 270 | 350 | 270 | 330 | 340 | 330 |
| | Density (g/cm$^3$) | 0.54 | 0.41 | 0.58 | 0.44 | 0.43 | 0.45 |

| | | Example 34 | | |
|---|---|---|---|---|
| | Functionalized Bicarbonate | Ex. 34A | | |
| | Funct. Method | Extrusion/milling | | |
| | Funct. Additive | 35 wt % PVOH | | |
| | D10/D50/D90 (μm) | 4/45/157 | | |
| | Plastisol Ex. | 34 p1 | 34 p2 | 34 p3 |
| PVC resin | 367 NF (pcr) | 100 | 100 | 100 |
| Filler | CaCO$_3$ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
| | Gelation temp (° C.) | 200 | 210 | 210 |
| | Gelation Time (sec.) | 120 | 90 | 120 |
| | Thickness (mm) | 2.31 | 2.32 | 2.32 |
| | Expansion ratio (%) | 310 | 310 | 310 |
| | Density (g/cm$^3$) | 0.46 | 0.48 | 0.49 |

Examples 35-36 (in Accordance with Invention)

Functionalization Additive=Lauric Acid

Two samples of functionalized sodium bicarbonate were prepared by extrusion of sodium bicarbonate particles with lauric acid, and then milling. The functionalized sodium bicarbonate samples are identified as Examples 35A and 36A (10 wt % lauric acid).

For Examples 35-36, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 16, wherein "per" means parts by weight of PVC resin.

TABLE 16

| | FunctionalizationAdditive = Lauric acid | |
|---|---|---|
| | Example | |
| | 35 | 36 |
| Functionalized Bicarbonate | Ex. 35A | Ex. 36A |
| Funct. Method | Extrusion/milling | Extrusion/milling |

TABLE 16-continued

| | FunctionalizationAdditive = Lauric acid | | | | | | | |
|---|---|---|---|---|---|---|---|---|
| | | Example | | | | | | |
| | | 35 | | | | 36 | | |
| | Funct. Additive | 10 wt % lauric acid | | | | 10 wt % lauric acid | | |
| | D10/D50/D90 (μm) | 3.5/20/55 | | | | 10/50/127 | | |
| | Plastisol Ex. | 35 p1 | 35 p2 | 35 p3 | 35 p4 | 36 p1 | 36 p2 | 36 p3 |
| PVC resin | 367 NF (pcr) | 100 | 100 | 100 | 100 | 100 | 100 | 100 |
| Filler | CaCO₃ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | 3 | 3 | 3 | — | 3 | 3 | — |
| Blowing agent | Func. Bicar. (pcr) | 8 | 8 | 8 | 8 | 8 | 8 | 8 |
| | Gelation temp (° C.) | 200 | 210 | 210 | 210 | 200 | 210 | 210 |
| | Gelation Time (sec.) | 120 | 90 | 120 | 90 | 120 | 120 | 90 |
| | Thickness (mm) | 2.88 | 2.83 | 3.28 | 2.09 | 2.23 | 2.96 | 2.11 |
| | Expansion ratio (%) | 380 | 380 | 440 | 280 | 300 | 390 | 280 |
| | Density (g/cm³) | 0.37 | 0.39 | 0.36 | 0.53 | 0.50 | 0.37 | 0.52 |

Examples 37-39 (in Accordance with Invention)

Functionalization Additive=Rosin Acid

Three samples of functionalized sodium bicarbonate were prepared by co-grinding (co-milling) sodium bicarbonate particles with rosin acid. The samples are identified as Examples 37A (1 wt % rosin acid), 38A (2 wt % rosin acid), 39A (10 wt % rosin acid).

For Examples 37-39, PVC Plastisol compositions were prepared in a Dispermat apparatus. In each example, the components of the plastisols were dispersed on a high speed mixer and then mixed and de-aerated under vacuum. The resulting liquid PVC pastes (plastisols) of Example 14 are in each case spread coated at a thickness of about 0.75 mm on a piece of paper (Claire Fontaine) and heated in a Thermosol Werner Mathis oven set at 200 or 210° C. for 90 or 120 seconds. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 17, where "pcr" means parts by weight of PVC resin.

TABLE 17

| | Functionalization Additive = rosin acid | | | | |
|---|---|---|---|---|---|
| | | Example 37 | | | |
| | Functionalized Bicarbonate | Ex. 37A | | | |
| | Funct. Method | Co-milling | | | |
| | Funct. additive | 1 wt % rosin acid | | | |
| | D10/D50/D90 (μm) | 3.3/19/56 | | | |
| | Plastisol Ex. | 37 p1 | 37 p2 | 37 p3 | 37 p4 |
| PVC resin | 367 NF (pcr) | 100 | 100 | 100 | 100 |
| Filler | CaCO₃ (pcr) | 120 | 120 | 120 | 120 |
| Plastisizer | Palatinol N (pcr) | 80 | 80 | 80 | 80 |
| Defoamer | BYK3155 (pcr) | 3 | 3 | 3 | 3 |
| Blowing agent | Func. Bicar. (pcr) | 8 | 8 | 8 | 8 |
| | Gelation temp (° C.) | 200 | 200 | 210 | 210 |
| | Gelation Time (sec.) | 90 | 120 | 90 | 120 |
| | Thickness (mm) | 2.35 | 2.13 | 2.77 | 2.34 |
| | Expansion ratio (%) | 310 | 280 | 370 | 310 |
| | Density (g/cm³) | 0.47 | 0.49 | 0.43 | 0.45 |
| | | Example 38 | | | |
| | Functionalized Bicarbonate | Ex. 38A | | | |
| | Funct. Method | Co-milling | | | |

TABLE 17-continued

| | | Functionalization Additive = rosin acid | | | | | |
|---|---|---|---|---|---|---|---|
| | Funct. additive | 2 wt % rosin acid | | | | | |
| | D10/D50/D90 (μm) | 1.7/10/24 | | | | | |
| | Plastisol Ex. | 38 p1 | 38 p2 | 38 p3 | 38 p4 | 38 p5 | 38 p6 |
| PVC resin | 367 NF (pcr) | 100 | 100 | 100 | 100 | 100 | 100 |
| Filler | CaCO₃ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | — | — | 3 | 3 | 3 | 3 |
| Blowing agent | Func. Bicar. (pcr) | 8 | 8 | 8 | 8 | 8 | 8 |
| | Gelation temp (° C.) | 200 | 210 | 200 | 200 | 210 | 210 |
| | Gelation Time (sec.) | 90 | 90 | 90 | 120 | 90 | 120 |
| | Thickness (mm) | 2.15 | 2.24 | 2.37 | 3.0 | 3.29 | 3.00 |
| | Expansion ratio (%) | 290 | 300 | 320 | 400 | 440 | 400 |
| | Density (g/cm³) | 0.53 | 0.50 | 0.47 | 0.36 | 0.36 | 0.39 |
| | | Example 39 | | | | | |
| | Functionalized Bicarbonate | Ex. 39A | | | | | |
| | Funct. Method | Co-milling | | | | | |
| | Funct. additive | 10 wt % rosin acid | | | | | |
| | D10/D50/D90 (μm) | 1.5/7.7/17.7 | | | | | |
| | Plastisol Ex. | 39 p1 | 39 p2 | 39 p3 | 39 p4 | 39 p5 | 39 p6 |
| PVC resin | 367 NF (pcr) | 100 | 100 | 100 | 100 | 100 | 100 |
| Filler | CaCO₃ (pcr) | 120 | 120 | 120 | 120 | 120 | 120 |
| Plastisizer | Palatinol N (pcr) | 80 | 80 | 80 | 80 | 80 | 80 |
| Defoamer | BYK3155 (pcr) | — | — | — | 3 | 3 | 3 |
| Blowing agent | Func. Bicar. (pcr) | 8 | 8 | 8 | 8 | 8 | 8 |
| | Gelation temp (° C.) | 200 | 210 | 210 | 200 | 210 | 210 |
| | Gelation Time (sec.) | 120 | 90 | 120 | 120 | 90 | 120 |
| | Thickness (mm) | 2.88 | 2.61 | 3.20 | 2.84 | 2.64 | 3.54 |
| | Expansion ratio (%) | 380 | 350 | 430 | 380 | 350 | 470 |
| | Density (g/cm³) | 0.38 | 0.43 | 0.35 | 0.38 | 0.42 | 0.32 |

Example 40 (in Accordance with Invention)

Functionalization Additive=Starch

One sample of functionalized sodium bicarbonate was prepared by spray coating of sodium bicarbonate particles in a fluidized bed with starch, and then milling. The functionalized sodium bicarbonate sample is identified as Example 40A (5 wt % starch).

For Example 40, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 18. "pcr" in TABLE 18 means parts by weight of resin.

TABLE 18

| | | Functionalization Additive = Starch | | |
|---|---|---|---|---|
| | | Example 40 | | |
| | Functionalized Bicarbonate | Ex. 40A | | |
| | Funct. Method | Spray Coating/milling | | |
| | Funct. Additive | 5 wt % starch | | |
| | D10/D50/D90 (μm) | 4.3/23/67 | | |
| | Plastisol Ex. | 40 p1 | 40 p2 | 40 p3 |
| PVC resin | 367 NF (pcr) | 100 | 100 | 100 |
| Filler | CaCO₃ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
| | Gelation temp (° C.) | 200 | 210 | 210 |
| | Gelation Time (sec.) | 120 | 90 | 120 |
| | Thickness (mm) | 2.88 | 2.59 | 2.60 |
| | Expansion ratio (%) | 380 | 350 | 350 |
| | Density (g/cm³) | 0.38 | 0.42 | 0.41 |

Examples 41-42 (in Accordance with Invention)

Functionalization Additive=Stearic Acid

Two samples of functionalized sodium bicarbonate was prepared by extrusion of sodium bicarbonate particles with stearic acid, and then milling. The functionalized sodium bicarbonate sample is identified as Examples 41A and 42A (5 wt % stearic acid).

For Examples 41-42, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 19, where "pcr" in means parts by weight of PVC resin.

Examples 43-44 (in Accordance with Invention)

Functionalization Additive=Polyoxyalkylene Compound (Polymer)

Two samples of functionalized sodium bicarbonate were prepared by extrusion of sodium bicarbonate particles with a polyoxyalkylene compound as the functionalization additive. The polyoxyalkylene compound is a product sold by BYK under the brandname BYK 3155 which may be used as an air release agent. The functionalized sodium bicarbonate samples are identified as Example 43A (10 wt % BYK 3155) and Example 44A (20 wt % BYK 3155).

For Examples 43-44, the same method of preparation of the PVC Plastisol compositions and preparation of PVC foams were used as described for Example 14. The expan-

TABLE 19

Functionalization Additive = Stearic acid

Example 41

| | | | | |
|---|---|---|---|---|
| | Functionalized Bicarbonate | | Ex. 41A | |
| | Funct. Method | | Extrusion/milling | |
| | Funct. Additive | | 5 wt % stearic acid | |
| | D10/D50/D90 (μm) | | 1.3/22/85 | |
| | Plastisol Ex. | 41 p1 | 41 p2 | 41 p3 |
| PVC resin | 367 NF (pcr) | 100 | 100 | 100 |
| Filler | CaCO$_3$ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
| | Gelation temp (° C.) | 200 | 210 | 210 |
| | Gelation Time (sec.) | 120 | 90 | 120 |
| | Thickness (mm) | 2.54 | 2.30 | 2.44 |
| | Expansion ratio (%) | 340 | 310 | 330 |
| | Density (g/cm$^3$) | 0.64 | 0.50 | 0.47 |

Example 42

| | | | | | | | | |
|---|---|---|---|---|---|---|---|---|
| | Functionalized Bicarbonate | | | | Ex. 42A | | | |
| | Funct. Method | | | | Extrusion/milling | | | |
| | Funct. Additive | | | | 5 wt % stearic acid | | | |
| | D10/D50/D90 (μm) | | | | 2.9/22/55 | | | |
| | Plastisol Ex. | 42 p1 | 42 p2 | 42 p3 | 42 p4 | 42 p5 | 42 p6 | 42 p7 |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | — | — | — | — | 3 | 3 | 3 |
| Blowing agent | Func. Bicar. (pcr) | 8 | 8 | 8 | 8 | 8 | 8 | 8 |
| | Gelation temp (° C.) | 200 | 210 | 210 | 210 | 200 | 210 | 210 |
| | Gelation Time (sec.) | 90 | 120 | 90 | 120 | 120 | 90 | 120 |
| | Thickness (mm) | 2.02 | 2.01 | 2.51 | 2.17 | 2.45 | 2.09 | 2.90 |
| | Expansion ratio (%) | 270 | 270 | 330 | 290 | 270 | 280 | 390 |
| | Density (g/cm$^3$) | 0.56 | 0.57 | 0.45 | 0.52 | 0.57 | 0.54 | 0.39 | sion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 20, where "pcr" means parts by weight of PVC resin.

TABLE 20

Functionalization Additive = Polyoxyalkylene compound (BYK3155)

| | | Example | | | | | | |
|---|---|---|---|---|---|---|---|---|
| | | 43 | | | | 44 | | |
| | Functionalized Bicarbonate | Ex. 43A | | | | Ex. 44A | | |
| | Funct. Method | extrusion | | | | extrusion | | |
| | Funct. additive | 10 wt % BYK3155 | | | | 20 wt % BYK3155 | | |
| | Plastisol Ex. | 43 p1 | 43 p2 | 43 p3 | 43 p4 | 44 p1 | 44 p2 | 44 p3 |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | — | — | — | — | — | — | — |
| Blowing agent | Func. Bicar. (pcr) | 9 | 9 | 9 | 9 | 10 | 10 | 10 |
| | Gelation temp (° C.) | 200 | 200 | 210 | 210 | 200 | 210 | 210 |
| | Gelation Time (sec.) | 90 | 120 | 90 | 120 | 120 | 90 | 120 |
| | Thickness (mm) | 2.03 | 2.06 | 2.30 | 2.08 | 2.43 | 2.60 | 2.45 |
| | Expansion ratio (%) | 270 | 270 | 310 | 280 | 320 | 350 | 330 |
| | Density (g/cm$^3$) | 0.52 | 0.54 | 0.47 | 0.51 | 0.45 | 0.41 | 0.44 |

Examples 45-46 (in Accordance with Invention)

With Two Functionalization Additives=Rosin Acid; PEG400

Two samples of functionalized sodium bicarbonate were prepared by applying two different functionalization additives (rosin acid, PEG400) added sequentially using two different methods of functionalization (co-grinding, extrusion). First the sodium bicarbonate particles were functionalized by co-grinding them with rosin acid as a first functionalization additive, and then the first-functionalized particles were functionalized by extruding them with PEG400 as a second functionalization additive to form second-functionalized particles. The samples are identified as Example 45A (9 wt % rosin acid, 10 wt % PEG400) and Example 46A (8 wt % rosin acid, 20 wt % PEG400).

For Examples 45-46, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 21 where "pcr" means parts by weight of PVC resin.

TABLE 21

Two Functionalization Additives = Rosin acid, PEG400 added sequentially

| | | Example | | | | | | |
|---|---|---|---|---|---|---|---|---|
| | | 45 | | | | 46 | | |
| | Functionalized Bicarbonate | Ex. 45A | | | | Ex. 46A | | |
| | 1$^{st}$ Funct. Method | co-milling | | | | co-milling | | |
| | 1$^{st}$ Funct. additive | 10 wt % rosin acid | | | | 10 wt % rosin acid | | |
| | 2$^{nd}$ Funct. Method | extrusion | | | | extrusion | | |
| | 2$^{nd}$ Funct. additive | 10 wt % PEG400 | | | | 20 wt % PEG400 | | |
| | Resulting Composition | 81 wt % Na bicarbonate/ 9 wt % rosin acid/ 10 wt % PEG400 | | | | 72 wt % Na bicarbonate/ 8 wt % rosin acid/ 20 wt % PEG400 | | |
| | Plastisol Ex. | 45 p1 | 45 p2 | 45 p3 | 45 p4 | 46 p1 | 46 p2 | 46 p3 |

TABLE 21-continued

Two Functionalization Additives = Rosin acid, PEG400 added sequentially

| | | Example | | | | | | |
|---|---|---|---|---|---|---|---|---|
| | | 45 | | | | 46 | | |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | — | — | — | — | — | — | — |
| Blowing agent | Func. Bicar. (pcr) | 9 | 9 | 9 | 9 | 10 | 10 | 10 |
| | Gelation temp (° C.) | 200 | 200 | 210 | 210 | 200 | 210 | 210 |
| | Gelation Time (sec.) | 90 | 120 | 90 | 120 | 120 | 90 | 120 |
| | Thickness (mm) | 2.03 | 2.06 | 2.30 | 2.08 | 2.43 | 2.60 | 2.45 |
| | Expansion ratio (%) | 270 | 270 | 310 | 280 | 320 | 350 | 330 |
| | Density (g/cm$^3$) | 0.52 | 0.54 | 0.47 | 0.51 | 0.45 | 0.41 | 0.44 |

Examples 47-48 (in Accordance with Invention)

With Two Functionalization Additives=Stearic Acid; PEG400

Two samples of functionalized sodium bicarbonate were prepared by applying two different functionalization additives (stearic acid, PEG400) added sequentially using two different methods of functionalization (co-grinding, extrusion). First the sodium bicarbonate particles were functionalized by co-grinding them with stearic acid as a first functionalization additive, and then the first-functionalized particles were functionalized by extruding them with PEG400 as a second functionalization additive to form second-functionalized particles. The samples are identified as Example 47A (3.2 wt % stearic acid, 10 wt % PEG400) and Example 48A (2.8 wt % stearic acid, 20 wt % PEG400).

For Examples 47-48, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio, and the density of the PVC foams are provided in TABLE 22 where "pcr" means parts by weight of PVC resin.

TABLE 22

Two Functionalization Additives = Stearic acid, PEG400 added sequentially

| | | Example 47 | | | | | | |
|---|---|---|---|---|---|---|---|---|
| | Functionalized Bicarbonate | Ex. 47A | | | | | | |
| | 1$^{st}$ Funct. Method | co-milling | | | | | | |
| | 1$^{st}$ Funct. additive | 3.5 wt % stearic acid | | | | | | |
| | 2$^{nd}$ Funct. Method | extrusion | | | | | | |
| | 2$^{nd}$ Funct. additive | 10 wt % PEG400 | | | | | | |
| | Resulting Composition | 86.9 wt % Na bicarbonate/ 3.2 wt % stearic acid/10 wt % PEG400 | | | | | | |
| | Plastisol Ex. | 47 p1 | 47 p2 | 47 p3 | 47 p4 | 47 p5 | 47 p6 | 47 p7 |
| PVC resin | 367 NF (pcr) | 100 | 100 | 100 | 100 | 100 | 100 | 100 |
| Filler | CaCO$_3$ (pcr) | 120 | 120 | 120 | 120 | 120 | 120 | 120 |
| Plastisizer | Palatinol N (pcr) | 80 | 80 | 80 | 80 | 80 | 80 | 80 |
| Defoamer | BYK3155 (pcr) | — | — | — | 3 | 3 | 3 | 3 |
| Blowing agent | Func. Bicar. (pcr) | 9 | 9 | 9 | 9 | 9 | 9 | 9 |
| | Gelation temp (° C.) | 200 | 210 | 210 | 200 | 200 | 210 | 210 |
| | Gelation Time (sec.) | 90 | 90 | 120 | 90 | 120 | 90 | 120 |
| | Thickness (mm) | 2.22 | 2.44 | 2.08 | 2.60 | 2.89 | 3.12 | 2.92 |
| | Expansion ratio (%) | 300 | 330 | 280 | 350 | 390 | 420 | 390 |
| | Density (g/cm$^3$) | 0.51 | 0.45 | 0.53 | 0.42 | 0.38 | 0.35 | 0.39 |

| | | Example 48 |
|---|---|---|
| | Functionalized Bicarbonate | Ex. 48A |
| | 1$^{st}$ Funct. Method | co-milling |
| | 1$^{st}$ Funct. additive | 3.5 wt % stearic acid |
| | 2$^{nd}$ Funct. Method | extrusion |

TABLE 22-continued

| Two Functionalization Additives = Stearic acid, PEG400 added sequentially | | | | | |
|---|---|---|---|---|---|
| | $2^{nd}$ Funct. additive | \multicolumn{4}{c}{20 wt % PEG400} |
| | Resulting Func. Bicar. Composition | \multicolumn{4}{c}{77.2 wt % Na bicarbonate/ 2.8 wt % stearic acid/20 wt % PEG400} |
| | Plastisol Ex. | 48 p1 | 48 p2 | 48 p3 | 48 p4 |
| PVC resin | 367 NF (pcr) | 100 | 100 | 100 | 100 |
| Filler | $CaCO_3$ (pcr) | 120 | 120 | 120 | 120 |
| Plastisizer | Palatinol N (pcr) | 80 | 80 | 80 | 80 |
| Defoamer | BYK3155 (pcr) | — | — | — | — |
| Blowing agent | Func. Bicar. (pcr) | 10 | 10 | 10 | 10 |
| | Gelation temp (° C.) | 200 | 200 | 210 | 200 |
| | Gelation Time (sec.) | 90 | 120 | 90 | 120 |
| | Thickness (mm) | 2.53 | 2.17 | 2.99 | 2.32 |
| | Expansion ratio (%) | 340 | 290 | 400 | 310 |
| | Density (g/cm³) | 0.44 | 0.52 | 0.38 | 0.49 |

Example 49 (in Accordance with Invention)

With One Functionalization Additive=Lauric Acid

With a Second Compound which Liberates CO2 Upon Heating (Second Blowing Agent)=Citric Acid One sample of functionalized sodium bicarbonate was prepared by applying one functionalization additive (lauric acid) to a mixture of sodium bicarbonate particles and powder of citric acid (a second compound which liberates CO2 upon heating) to extrude the mixture followed by milling extrudates to reduce the particle size of the resulting functionalized bicarbonate particles (extrusion/milling). First the sodium bicarbonate particles were blended with citric acid powder in a weight ratio of 80 sodium bicarbonate to 20 citric acid, then adding lauric acid to this blend and subjecting the resulting mixture to extrusion, and then milling. The samples are identified as Example 49A (19 wt % citric acid, 5 wt % lauric acid).

For Example 49, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 23 where "per" means parts by weight of PVC resin.

TABLE 23

| With one Functionalization Additive = lauric acid With one additional endothermic blowing agent = citric acid | |
|---|---|
| | Example 49 |
| Functionalized bicarbonate | Ex. 49A |
| $1^{st}$ blowing agent | 80 wt % sodium bicarbonate |
| $2^{nd}$ blowing agent | 20 wt % citric acid |
| Method | mixing |
| $2^{nd}$ Funct. additive | 5 wt % lauric acid |
| Funct. Method | Extrusion/milling |

TABLE 23-continued

| With one Functionalization Additive = lauric acid With one additional endothermic blowing agent = citric acid | | | | |
|---|---|---|---|---|
| | \multicolumn{4}{c}{Example 49} |
| Resulting Func. Bicar. Composition | \multicolumn{4}{c}{76 wt % Na bicarbonate/19 wt % citric acid/5 wt % lauric acid} |
| D10/D50/D90 (μm) | \multicolumn{4}{c}{2.9/23/70} |
| | Plastisol Ex. | 49 p1 | 49 p2 | 49 p3 | 49 p4 |

| | | 49 p1 | 49 p2 | 49 p3 | 49 p4 |
|---|---|---|---|---|---|
| PVC resin | 367 NF (pcr) | 100 | 100 | 100 | 100 |
| Filler | $CaCO_3$ (pcr) | 120 | 120 | 120 | 120 |
| Plastisizer | Palatinol N (pcr) | 80 | 80 | 80 | 80 |
| Defoamer | BYK3155 (pcr) | — | — | 3 | 3 |
| Blowing agent | Func. Bicar. (pcr) | 8 | 8 | 8 | 8 |
| | Gelation temp (° C.) | 200 | 210 | 200 | 210 |
| | Gelation Time (sec.) | 120 | 120 | 120 | 120 |
| | Thickness (mm) | 2.15 | 2.29 | 2.28 | 2.13 |
| | Expansion ratio (%) | 290 | 310 | 300 | 280 |
| | Density (g/cm³) | 0.51 | 0.48 | 0.48 | 0.50 |

Example 50 (in Accordance with Invention)

With One Functionalization Additive=Lauric Acid

With a Second Compound which Liberates CO2 Upon Heating (Second Blowing Agent)=Fumaric Acid One sample of functionalized sodium bicarbonate was prepared by applying one functionalization additive (lauric acid) to a mixture of sodium bicarbonate particles and powder of fumaric acid (a second compound which liberates CO2 upon heating) to extrude the mixture followed by milling extrudates to reduce the particle size of the resulting functionalized bicarbonate particles (extrusion/milling). First the sodium bicarbonate particles were blended with fumaric acid powder in a weight ratio of 80 sodium bicarbonate to 20 fumaric acid, then adding lauric acid to this blend and subjecting the resulting mixture to extrusion and then milling. The sample is identified as Example 50A (19 wt % fumaric acid, 5 wt % lauric acid).

For Example 50, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 24, where "per" means parts by weight of PVC resin.

TABLE 24

With one Functionalization Additive = lauric acid
With a second endothermic blowing agent = fumaric acid

|  |  | Example 50 | | |
|---|---|---|---|---|
|  | Functionalized bicarbonate | Ex. 50A | | |
|  | 1$^{st}$ blowing agent | 80 wt % sodium bicarbonate | | |
|  | 2$^{nd}$ blowing agent | 20 wt % fumaric acid | | |
|  | Method | mixing | | |
|  | 2$^{nd}$ Funct. additive | 5 wt % lauric acid | | |
|  | Funct. Method | Extrusion/milling | | |
|  | Resulting Func. Bicar. Composition | 76 wt % Na bicarbonate/19 wt % fumaric acid/5 wt % lauric acid | | |
|  | D10/D50/D90 (μm) | 2.7/21/79 | | |
|  | Plastisol Ex. | 50 p1 | 50 p2 | 50 p3 |
| PVC resin | 367 NF (pcr) | 100 | 100 | 100 |
| Filler | CaCO$_3$ (pcr) | 120 | 120 | 120 |
| Plastisizer | Palatinol N (pcr) | 80 | 80 | 80 |
| Defoamer | BYK3155 (pcr) | 3 | 3 | 3 |
| Blowing agent | Func. Bicar. (pcr) | 8 | 8 | 8 |
|  | Gelation temp (° C.) | 200 | 210 | 210 |
|  | Gelation Time (sec.) | 120 | 90 | 120 |
|  | Thickness (mm) | 2.56 | 2.10 | 2.29 |
|  | Expansion ratio (%) | 340 | 280 | 310 |
|  | Density (g/cm$^3$) | 0.50 | 0.56 | 0.49 |

Example 51 (in Accordance with Invention)

With One Functionalization Additive=Maltodextrin

With a Second Blowing Agent=Citric Acid

One sample of functionalized sodium bicarbonate was prepared by applying one functionalization additive (maltodextrin) to a mixture of sodium bicarbonate particles and powder of citric acid (a second blowing agent compound which liberates CO2 upon heating) to extrude the mixture and then mill. First the sodium bicarbonate particles were blended with citric acid powder in a weight ratio of 80 sodium bicarbonate to 20 citric acid, then adding maltodextrin to this blend and subjecting the resulting mixture to extrusion, and then milling. The sample is identified as Example 48A (16 wt % citric acid, 20 wt % maltodextrin).

For Example 51, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 25, where "pcr" means parts by weight of resin.

TABLE 25

With one Functionalization Additive = maltodextrin
With one additional endothermic blowing agent = citric acid

|  |  | Example 51 | |
|---|---|---|---|
|  | Functionalized bicarbonate | Ex. 51A | |
|  | 1$^{st}$ blowing agent | 80 wt % sodium bicarbonate | |
|  | 2$^{nd}$ blowing agent | 20 wt % citric acid | |
|  | Method | mixing | |
|  | 2$^{nd}$ Funct. additive | 20 wt % maltodextrin | |
|  | Funct. Method | Extrusion/milling | |
|  | Resulting Func. Bicar. Composition | 64 wt % Na bicar/16 wt % citric acid/20 wt % maltodextrin | |
|  | D10/D50/D90 (μm) | 9.9/37/98 | |
|  | Plastisol Ex. | 51 p1 | 51 p2 |
| PVC resin | 367 NF (pcr) | 100 | 100 |
| Filler | CaCO$_3$ (pcr) | 120 | 120 |
| Plastisizer | Palatinol N (pcr) | 80 | 80 |
| Defoamer | BYK3155 (pcr) | — | 3 |
| Blowing agent | Func. Bicar. (pcr) | 8 | 8 |
|  | Gelation temp (° C.) | 210 | 210 |
|  | Gelation Time (sec.) | 90 | 120 |
|  | Thickness (mm) | 2.18 | 2.07 |
|  | Expansion ratio (%) | 290 | 280 |
|  | Density (g/cm$^3$) | 0.51 | 0.53 |

Example 52 (in Accordance with Invention)

With One Functionalization Additive=Epoxidized Soybean Oil

With a Second Blowing Agent=Citric Acid

One sample of functionalized sodium bicarbonate was prepared by applying one functionalization additive (epoxidised soy bean oil sold as HSE Drapex 392 from Galata Chemicals)) to a mixture of sodium bicarbonate particles and powder of citric acid (a second blowing agent compound which liberates CO2 upon heating) to extrude the mixture, and then mill. First the sodium bicarbonate particles were blended with citric acid powder in a weight ratio of 80 sodium bicarbonate to 20 citric acid, then adding the epoxidized soybean oil (HSE Drapex 392) to this blend and subjecting the resulting mixture to extrusion, and then milling. The sample is identified as Example 52A (19 wt % citric acid, 5 wt % maltodextrin).

For Example 52, the same method of preparation of the PVC Plastisol compositions and preparation of PVC foams were used as described for Example 14. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 26 where "pcr" means parts by weight of PVC resin.

TABLE 26

With one Functionalization Additive = epoxidized soybean oil
With one additional endothermic blowing agent = citric acid

|  |  | Example 52 | |
|---|---|---|---|
|  | Functionalized bicarbonate | Ex. 52A | |
|  | 1st blowing agent | 80 wt % sodium bicarbonate | |
|  | 2nd blowing agent | 20 wt % citric acid | |
|  | Method | mixing | |
|  | 2nd Funct. additive | 5 wt % HSE Drapex 392 | |
|  | Funct. Method | Extrusion/milling | |
|  | Resulting Func. Bicar. Composition | 76 wt % Na bicar/19 wt % citric acid/5 wt % epoxidised soybean oil | |
|  | D10/D50/D90 (μm) | 9.9/37/98 | |
|  | Plastisol Ex. | 52 p1 | 52 p2 |
| PVC resin | 367 NF (pcr) | 100 | 100 |
| Filler | $CaCO_3$ (pcr) | 120 | 120 |
| Plastisizer | Palatinol N (pcr) | 80 | 80 |
| Defoamer | BYK3155 (pcr) | 3 | 3 |
| Blowing agent | Func. Bicar. (pcr) | 8 | 8 |
|  | Gelation temp (° C.) | 200 | 210 |
|  | Gelation Time (sec.) | 120 | 90 |
|  | Thickness (mm) | 2.14 | 2.30 |
|  | Expansion ratio (%) | 290 | 310 |
|  | Density (g/cm³) | 0.53 | 0.47 |

Example 53 (not in Accordance with Invention)

Functionalization Additive=None

A commercial sodium bicarbonate (SB/03 from Solvay) was milled to reduce the particle size. The sample is identified as Example 53A (without functionalization additive).

For Example 53, PVC Plastisol compositions were prepared in a Dispermat apparatus. In each example, the components of the plastisols were dispersed on a high speed mixer and then mixed and de-aerated under vacuum. The resulting liquid PVC pastes (plastisols) are in each case spread coated at a thickness of about 0.75 mm on a piece of paper (Claire Fontaine) and heated in a Thermosol Werner Mathis oven set at 200 or 210° C. for 90 or 120 seconds. The expansion ratio was calculated as the ratio of the thickness of the foamed product after Werner Mathis oven heating over the initial thickness of the spread coated layer (here about 0.75 mm) before it passed the Werner Mathis oven heating. The specific components and amounts in each plastisol, the oven temperature, the time for gelation, the thickness of the foamed product after oven heating, the expansion ratio and the density of the PVC foams are provided in TABLE 27, where "pcr" means parts by weight of PVC resin.

TABLE 27

Without functionalization additive
Without additional endothermic blowing agent

|  |  | Example 53 | | | |
|---|---|---|---|---|---|
|  | Non-Functionalized bicarbonate | Ex. 53A | | | |
|  | D10/D50/D90 (μm) | 1.3/7/16 | | | |
|  | Plastisol Ex. | 53 p1 | 53 p2 | 53 p3 | 53 p4 |
| PVC resin | 367 NF (pcr) | 100 | 100 | 100 | 100 |
| Filler | $CaCO_3$ (pcr) | 120 | 120 | 120 | 120 |
| Plastisizer | Palatinol N (pcr) | 80 | 80 | 80 | 80 |
| Defoamer | BYK3155 (pcr) | — | — | — | — |
| Blowing agent | Non-Func. Bicar. (pcr) | 8 | 8 | 8 | 8 |
|  | Gelation temp (° C.) | 200 | 200 | 210 | 210 |
|  | Gelation Time (sec.) | 90 | 120 | 90 | 120 |
|  | Thickness (mm) | 1.22 | 1.07 | 1.20 | 1.11 |
|  | Expansion ratio (%) | 160 | 140 | 160 | 150 |
|  | Density (g/cm³) | 0.90 | 1.03 | 0.92 | 1.00 |

Example 54

D50, Size Span, TGA and DSC Analysis

A thermogravimetric analysis (TGA; 35 to 250° C./10° C./min) and a differential scanning calorimetry (DSC) thermal analysis were performed on some samples of functionalized particulate sodium bicarbonates and a non-functionalized sodium bicarbonate (Ex. 53A). The results are provided in TABLE 28. The $D_{50}$ (μm) and size span of these sodium bicarbonates, as well as the lowest density (ρ) and highest expansion ratio (%) of PVC foams with their corresponding gelation time at the corresponding oven temperature obtained with these sodium bicarbonates are provided in TABLE 28.

TABLE 28

| | | | | | PVC Plastisol testing | | TGA/DSC Analysis | | | | |
|---|---|---|---|---|---|---|---|---|---|---|---|
| | Particulate sodium bicarbonate | | | | Gel temp/ time | ρ**/ exp ratio | TGA Total loss (%) | 15% Loss Temp (° C.) | 95% Loss Temp (° C.) | dTGA Start Loss Temp (° C.) | dTGA Max Loss Temp (° C.) | DSC Max peak Temp (° C.) |
| EX | Additive | * | $D_{50}$ | Size Span | | | | | | | | |
| 15A | 10 wt % Carnauba wax | EB | 57 | 2.0 | 210/ 120 | 0.37/ 410 | 33.5 | 157.9 | 183.1 | 130.5 | 170.7 | 175.9 |
| 16A | 25 wt % GMS | GB | 29 | 5.3 | 210/ 120 | 0.42/ 340 | 32.2 | 136.7 | 195.7 | 126.3 | 172.6 | 178.1 |
| 18A | 4 wt % poly(meth)acrylate | EB | 30 | 2.3 | 210/ 90 | 0.33/ 430 | 36.5 | 125.8 | 165.2 | 99.4 | 138.2 | 146.0 |

TABLE 28-continued

| | Particulate sodium bicarbonate | | | | PVC Plastisol testing | | TGA/DSC Analysis | | | | | |
|---|---|---|---|---|---|---|---|---|---|---|---|---|
| EX | Additive | * | $D_{50}$ | Size Span | Gel temp/ time | ρ**/ exp ratio | TGA Total loss (%) | Temp 15% Loss (° C.) | Temp 95% Loss (° C.) | dTGA Start Loss Temp (° C.) | dTGA Max Loss Temp (° C.) | DSC Max peak Temp (° C.) |
| 21A | 20 wt % arabic gum | FB | 29 | 3.0 | 200/ 120 | 0.42/ 360 | 34.8 | 127.6 | 185.7 | 96.6 | 144.2 | 151.6 |
| 34A | 35 wt % PVOH | EB | 45 | 3.4 | 200/ 120 | 0.46/ 310 | 39.7 | 150.7 | 230.2 | 106.3 | 151.9 | 233.6 |
| 37A | 1 wt % Rosin acid | B | 19 | 2.8 | 210/ 90 | 0.43/ 370 | 36.6 | 155.9 | 173.4 | 120.4 | 158.9 | 164.3 |
| 53A control | — | B | 7 | 2.1 | 200/ 90 | 0.90/ 160 | 35.4 | 116.7 | 149.8 | 77.3 | 129.2 | 137.1 |

* Methods of functionalization: EB: Extrusion followed by milling; GB: Spray agglomeration followed by milling; FB: fluid bed spray coating following by milling; B: Milling
**ρ = Density of PVC foam (g/cm³); Exp ratio = expansion ratio obtained at the gel temperature/time The TGA results show that both the $CO_2$ release beginning temperature and the CO2 release maximum temperature increased in the functionalized sodium bicarbonate samples comprising a functionalizing additive compared to a milled commercial sodium bicarbonate product SOLVAY SB/03 (Ex. 53A) which was not functionalized with an additive.

The DSC analysis showed that the peak temperature for the functionalized sodium bicarbonate samples comprising a functionalizing additive was higher than a milled commercial sodium bicarbonate product SOLVAY SB/03 (Ex. 53A) which was not functionalized with an additive.

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements, embodiments, and/or features of processes or methods described herein can be combined in a variety of ways without departing from the scope and disclosure of the present teaching, whether explicit or implicit herein.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

We claim:

1. A chemical blowing agent for foaming a thermoplastic polymer precursor, said chemical blowing agent comprising a functionalized particulate bicarbonate, wherein said functionalized particulate bicarbonate contains at least one additive, wherein the functionalized particulate bicarbonate is obtained by grinding or co-grinding with the additive(s), and wherein said additive in the functionalized particulate bicarbonate is lauric acid and/or linoleic acid.

2. The chemical blowing agent according to claim 1, wherein the blowing agent does not contain any further blowing agent which is an exothermic blowing agent.

3. The chemical blowing agent according to claim 1, wherein the chemical blowing agent does not contain a compound which liberates ammonia gas during heating.

4. The chemical blowing agent according to claim 1, wherein the additive in the functionalized particulate bicarbonate further comprises a poly(meth)acrylate or a derivative thereof.

5. The chemical blowing agent according to claim 1, wherein the additive in the functionalized particulate bicarbonate further comprises at least one polymer selected from the group consisting of polyoxyalkylenes and derivatives thereof including polyethylene glycols, poly(meth)acrylates and derivatives thereof, polyvinylalcohol, polysaccharides and combinations thereof.

6. The chemical blowing agent according to claim 5, wherein the polysaccharides are selected from the group consisting of modified starch, maltodextrin, arabic gum and combinations thereof.

7. The chemical blowing agent according to claim 1, wherein the additive in the functionalized particulate bicarbonate further comprises rosin acid or a derivative thereof.

8. The chemical blowing agent according to claim 1, wherein the additive in the functionalized particulate bicarbonate further comprises an epoxidized soy bean oil.

9. The chemical blowing agent according to claim 1, wherein the additive in the functionalized particulate bicarbonate further comprises at least one wax selected from the group consisting of beeswax, carnauba wax and combinations thereof.

10. The chemical blowing agent according to claim 1, wherein the bicarcbonate of the functionalized particulate bicarbonate comprises sodium bicarbonate.

11. The chemical blowing agent according to claim 1, wherein the particles of the functionalized particulate bicarbonate have a particle size distribution of $D_{50}$ of more than 1 µm and at most 250 µm.

12. The chemical blowing agent according to claim 1, wherein the particles of the functionalized particulate bicarbonate have a particle size distribution of $D_{50}$ of at most 1 µm.

13. The chemical blowing agent according to claim 1, wherein the functionalized particulate bicarbonate is obtained by at least one said process and is further subjected to milling to reduce its mean particle size.

14. The chemical blowing agent according to claim 1, further comprising a second compound which liberates $CO_2$ upon heating, said second compound being selected from the group consisting of a carboxylic or polycarboxylic acid, derivative thereof, or salts thereof.

15. The chemical blowing agent according to claim 14, wherein said second compound is functionalized with at least one additive which is different or the same as the one in the functionalized particulate bicarbonate.

16. The chemical blowing agent according to claim 14, wherein said second compound is at least one of:
   fumaric acid,
   tartaric acid,
   citric acid, citrates, or esters of citric acid; or combination thereof.

17. A foamable polymer composition, comprising a polymer, optionally a foaming stabilizer, and the chemical blowing agent according to claim 1.

18. The foamable polymer composition according to claim 17, wherein the polymer is a PVC, a polyurethane, a polyolefin, or a polyamide.

19. A foamable PVC plastisol composition, comprising a PVC resin, optionally a foaming stabilizer, and the chemical blowing agent according to claim 1.

20. A process for manufacturing a polymer, comprising heating the foamable polymer composition according to claim 17 which comprises the functionalized particulate bicarbonate at a temperature suitable for liberating $CO_2$ gas and melting the polymer during agelation time at a temperature above glass transition temperature $T_g$ and/or above melting temperature $T_m$ of the polymer which is less than 130 seconds.

21. A foamed polymer obtained by the process of claim 20, wherein the polymer is a PVC, a polyurethane, a polyolefin, or a polyamide.

22. A process for manufacturing a foamed PVC polymer, comprising heating the foamable PVC plastisol composition according to claim 19 which comprises the functionalized particulate bicarbonate and the PVC resin at a temperature suitable for liberating $CO_2$ gas and melting the PVC polymer during a gelation time from 90 seconds to 120 seconds at a temperature from 190 to 210° C. to provide a foamed PVC polymer.

23. The process according to claim 22, wherein the foamable PVC plastisol composition is spread coated on a surface before heating and melting, and wherein the foamed polymer has an expansion ratio of at least 270 and/or has a density of less than 0.6 g/cm³.

24. A process for manufacturing a foamed polymer, comprising heating the foamable PVC plastisol composition according to claim 19 which comprises the functionalized particulate bicarbonate at a temperature suitable for liberating $CO_2$ gas and melting the PVC resin during a gelation time, wherein said gelation time with the chemical blowing agent comprising the functionalized particulate is less than the gelation time that would be obtained with a chemical blowing agent liberating $N_2$, all other components in the foamable PVC plastisol composition being the same.

25. A foamed PVC obtained by the process of claim 22.

* * * * *